(12) United States Patent
Aoki et al.

(10) Patent No.: US 7,359,833 B2
(45) Date of Patent: Apr. 15, 2008

(54) INFORMATION PROCESSING SYSTEM AND METHOD

(75) Inventors: Yoshitaka Aoki, Odawara (JP); Kenichi Soejima, Odawara (JP)

(73) Assignee: Hitachi, Ltd., Tokyo (JP)

( * ) Notice: Subject to any disclaimer, the term of this patent is extended or adjusted under 35 U.S.C. 154(b) by 679 days.

(21) Appl. No.: 10/934,729

(22) Filed: Sep. 7, 2004

(65) Prior Publication Data

US 2006/0015296 A1 Jan. 19, 2006

(30) Foreign Application Priority Data

Jul. 15, 2004 (JP) ............................. 2004-208340

(51) Int. Cl.
*G21C 17/00* (2006.01)

(52) U.S. Cl. ..................... 702/185; 707/202; 714/1; 714/2; 714/45

(58) Field of Classification Search ................ 707/202; 702/185; 714/1, 2, 45
See application file for complete search history.

(56) References Cited

U.S. PATENT DOCUMENTS

| | | | |
|---|---|---|---|
| 5,742,792 A | 4/1998 | Yanai et al. | |
| 5,968,182 A | 10/1999 | Chen et al. | |
| 6,279,032 B1 | 8/2001 | Short et al. | |
| 6,401,120 B1 * | 6/2002 | Gamache et al. | ........... 709/226 |
| 6,453,430 B1 | 9/2002 | Singh et al. | |
| 6,772,231 B2 | 8/2004 | Reuter et al. | |
| 2001/0011358 A1 * | 8/2001 | Ochiai | ........................ 714/45 |
| 2002/0169996 A1 | 11/2002 | King et al. | |
| 2003/0070114 A1 * | 4/2003 | Yasuda | ........................ 714/20 |
| 2005/0055468 A1 | 3/2005 | Reuter et al. | |
| 2005/0144505 A1 * | 6/2005 | Takeuchi et al. | ................ 714/4 |

FOREIGN PATENT DOCUMENTS

JP 2003-076592 9/2001

\* cited by examiner

*Primary Examiner*—Apu Mofiz
*Assistant Examiner*—Hung D Le
(74) *Attorney, Agent, or Firm*—Reed Smith; Stanley P. Fisher, Esq.; Juan Carlos A. Marquez, Esq.

(57) ABSTRACT

An information processing system comprises a fault storage area which stores fault data relating to specific faults, an information issuing portion which issues information, an intermediate information processing portion, and an information filter portion. The intermediate information processing portion receives and outputs information issued by the information issuing portion, and upon receiving an anomaly in response to output of information, prior to notifying the information issuing portion of the anomaly, re-outputs the output information at least once, but if an anomaly is received even after re-output at least once, notifies the information issuing portion of the anomaly. The information filter portion receives information issued by the intermediate information processing portion, judges whether fault data is stored in the fault storage area, outputs the received information to the resource portion if fault data is not stored, and notifies the intermediate information processing portion of the anomaly in response to the received information if fault data is stored.

12 Claims, 17 Drawing Sheets

FIG.4

| DESCRIPTION | VALUE |
|---|---|
| I/O REQUEST IDENTIFIER | EXAMPLE: 0X1234 |
| FAULT I/O RETURN VALUE | EXAMPLES: TIMEOUT, DISCONNECT, BUSY |
| FAULT SCSI COMMAND RETURN VALUE | EXAMPLES: TIMEOUT, DISCONNECT, BUSY |
| FAULT REMOTE COPY CONTROL RETURN VALUE | EXAMPLES: TIMEOUT, DISCONNECT, BUSY |

| SCSI COMMAND | SCSI COMMAND TYPE JUDGMENT RESULT |
|---|---|
| RESERVE | LOCK |
| RELEASE | |
| RESET | |
| READ | READ/WRITE |
| WRITE | |

| I/O RETURN VALUE | I/O RETURN VALUE JUDGMENT RESULT |
|---|---|
| SUCCESS | NORMAL STATUS |
| TIMEOUT | ANOMALY STATUS |
| DISCONNECT | |
| BUSY | ANOMALY STATUS OR CONFLICT |

| SCSI COMMAND RETURN VALUE | SCSI COMMAND RETURN VALUE JUDGMENT RESULT |
|---|---|
| GOOD | NORMAL STATUS |
| TIMEOUT | ANOMALY STATUS |
| DISCONNECT | |
| BUSY | |
| CONFLICT | CONFLICT |

| REMOTE COPY CONTROL RETURN VALUE | REMOTE COPY CONTROL JUDGMENT RESULT |
|---|---|
| GOOD | NORMAL STATUS |
| TIMEOUT | ANOMALY STATUS |
| DISCONNECT | |
| BUSY | |
| CONFLICT | CONFLICT |

3560

| REMOTE COPY CONTROL RETURN VALUE | CONVERTED I/O RETURN VALUE | CONVERTED SCSI COMMAND RETURN VALUE |
|---|---|---|
| GOOD | SUCCESS | GOOD |
| TIMEOUT | TIMEOUT | TIMEOUT |
| DISCONNECT | DISCONNECT | DISCONNECT |
| BUSY | BUSY | BUSY |
| CONFLICT | BUSY | CONFLICT |

3570

INFORMATION PROCESSING SYSTEM AND METHOD

CROSS-REFERENCE TO PRIOR APPLICATION

This application relates to and claims priority from Japanese Patent Application No. 2004-208340, filed on Jul. 15, 2004, the entire disclosure of which is incorporated herein by reference.

BACKGROUND OF THE INVENTION

1. Field of the Invention

This invention relates to an information processing technology using a computer, and in particular to information processing in cases in which an anomaly occurs due to, for example, a specific fault.

2. Description of the Related Art

Computer systems are known which have, for example, a host device (for example, a host computer), and first and second storage device systems (for example, disk array systems such as RAID (Redundant Array of Independent Disks)). Each of the first and second storage device systems comprises at least one logical volume. One logical volume is prepared for one or a plurality of physical storage devices (for example, hard disks) comprised by the storage device system.

In such a computer system, for example, remote copy processing may be performed. In remote copying, the data in a logical volume of a first storage device system is copied to a logical volume in a second storage device system, without passing through a host device. The logical volume which is the copying source of the remote copying is called the copy source volume, and the logical volume which is the copying target of the remote copying is called the copy target volume. The copy source volume and copy target volume may, for example, have the same storage capacity and form a one-to-one relationship (in others, form a copy pair). The data in the copy source volume is copied to the copy target volume via a remote copy line (for example, a dedicated circuit, public circuit, or similar) connecting the first and second storage device systems. In remote copying, the copying direction is for example unidirectional, and in the even of write requests from a host device, the copy source volume can accept a request, but the copy target volume cannot accept a request. When data contained in the copy source volume is updated (for example, when a second data item is overwritten by a first data item), the update data (for example, the difference between the first and second data items) is written to the copy target volume from the copy source volume via a remote copy line, and by this means the data in the copy source volume and the data in the copy target volume are made the same. Technology related to such remote copying is disclosed in for example Japanese Patent Laid-open No. 2003-76592 and U.S. Pat. No. 5,742,792.

A computer system may comprise a plurality of host devices, such as for example first and second host devices. In such a computer system, the same logical volume may be shared by the first and second host devices (below, such logical volumes are called "shared volumes"). A shared volume is exclusively controlled. Specifically, control is executed such that access requests for a shared volume are permitted only from the first host device, and access requests from the second host device in the same time period are not permitted. More specifically, in a computer system which for example adopts SCSI (Small Computer System Interface) as the interface between host devices and storage device systems, when a first host device sends to a shared volume a reserve-system command defined by the SCSI protocol, and when the shared volume is not being used by any host device, the storage device system, upon receiving the above reserve-system command from the first host device, puts the shared volume into the reserved state with respect to the first host device, and by this means can ensure that access requests from a second host device are not accepted. If, while the shared volume is in the reserved state with respect to the first host device, a request to access the shared volume is received from the second host device, the storage device system returns to the second host device status data (for example, data indicating the reservation conflict status) indicating that the shared volume has been reserved by another host device.

A host device comprises, for example, application software (henceforth called an "application") and driver software for the storage device system (henceforth called "disk control software"). An application can issue I/O requests for writing of data to a logical volume or for reading of data from a logical volume, according to user operations or other conditions. Disk control software can receive an I/O request issued by an application, convert the I/O request into a format which can be processed by the storage device system (for example, a format based on the SCSI protocol), and send the converted I/O request to the storage device system. Also, disk control software may for example receive data indicating an anomaly status (henceforth called "anomaly status data") from the storage device system as a response to an I/O request. When anomaly status data which has been received indicates a specific anomaly status, the disk control software can execute rewrite processing, such as for example processing to again send to the storage device system a converted I/O request which has been sent in the past, as described above.

However, a plurality of host devices can be connected to configure a cluster. In this case, each of the host devices (hereafter, for convenience, called "cluster servers") comprised by the cluster is equipped with, for example, software (hereafter "cluster software") to realize the cluster. Below, for convenience, resources managed by a cluster (for example, physical storage devices and other hardware, as well as database management system and other software) are called "cluster resources". A computer system comprising a cluster is called a "cluster system".

By performing what is called fail-over processing, a cluster system can continue usage of cluster resources. Specifically, when for example use of a certain cluster resource by a certain cluster server cannot be continued due to the occurrence of a fault in the cluster server, the cluster software within the cluster server performs fail-over processing, that is, performs processing to switch use of the above cluster resource to another cluster server which is operating normally, so that use of the cluster resource can be continued. The plurality of cluster servers comprised by the cluster system are connected by a network using the Internet protocol (IP) or similar. The cluster software in each of the cluster servers, by communicating with other cluster servers over this network, monitors the states of the communicating cluster servers. This communication is called "cluster communication" or "heartbeat communication".

A cluster system in which a plurality of cluster servers share a single storage device system is called, for example, a shared disk model cluster system. In a shared disk model cluster system, when for example the heartbeat communication between two cluster servers is cut off, each of the two cluster servers can confirm the operating state of the other cluster server through shared exclusive control using a shared volume, and by this means it is possible to prevent a state (hereafter called a "split-brain" state) in which the two cluster servers operate separately. Below, for convenience, control performed to prevent such a split-brain state (in the above example, shared exclusive control) is called "arbitration".

Cluster software for realization of shared disk model cluster systems comprises software to, for example, perform shared exclusive control (that is, requesting that the disk control software issue reserve-system commands) for storage disks used to perform arbitration (called, for example, arbitration disks, arbitration volumes, or quorum disks) using SCSI commands, by this means avoiding a split-brain state. For example, cluster software can periodically issue I/O requests to a storage device system via disk control software, reference response results received via the disk control software from the storage device system in response, and monitor the state of the storage device system receiving the I/O requests. When a response request is an anomaly status, the cluster software judges whether a fault has occurred, and can execute the above-described fail-over processing. Cluster software has been disclosed in for example U.S. patent application Ser. No. 6,279,032 and U.S. patent application Ser. No. 6,401,120.

SUMMARY OF THE INVENTION

However, when in the above-described technology of the prior art the disk control software, for example, receives anomaly status data indicating a specific anomaly status (as an example, a timeout), retry processing, such as for example. executing processing to again transmit to the storage device system an I/O request transmitted in the past, may be performed without reporting the anomaly to the higher-level application. When in response to this the specific anomaly status data is again received, the disk control software may again execute retry processing without reporting the anomaly to the higher-level application. The disk control software may repeat the above-described retry processing, without reporting the anomaly to the higher-level application, for the number of retry times set by a user in advance, or until there is recovery from the anomaly and data indicating normal status is received.

When an anomaly report is received from the disk control software, cluster software, which is one application, can judge that an anomaly has occurred and initiate the above-described fail-over processing. In other words, until the cluster software receives the anomaly report from the disk control software, the same state is maintained without initiation of the fail-over processing. As a consequence, the initiation of fail-over processing is delayed.

Problems of a nature similar to the above-described problem can conceivably exist in various systems other than cluster systems. For example, in a system in which an intermediate information processing portion intervenes between an information issuing portion and a resource portion, when the intermediate information processing portion issues information to the resource portion in response to information from the information issuing portion (for example, a request relating to resource use), and receives an anomaly report from the resource portion in response to this information, if the information is reissued to the resource portion at least once without informing the information issuing portion of the anomaly, and if the information issuing portion is to be notified of the anomaly when an anomaly is again received, then there exists the problem of a delay in notification of the information issuing portion of the anomaly.

Hence an object of this invention is to ensure that there is no delay of initiation of processing by the information issuing portion in response to an anomaly, even when the information processing system is configured such that the intermediate information processing portion reissues information without reporting an anomaly to the information issuing portion. Specifically, one object of this invention is to ensure that there is no delay of initiation of fail-over processing by cluster software, even when disk control software is configured to reissue an I/O request upon receiving an anomaly report without reporting the anomaly to the cluster software.

Still other objects of the invention will become clear from the following explanations.

An information processing system (hereafter called the "first information processing system") according to a first aspect of this invention can communicate with a storage system, and comprises a program storage area which stores a plurality of computer programs, a fault storage area which stores fault data which is data relating to specific faults, and at least one processor which reads and executes at least one computer program from the above storage area. The above plurality of computer programs comprise an information issuing program which issues information, an intermediate processing program, and an information filter program. The intermediate processing program receives and outputs information issued by the above information issuing program, and when an anomaly report is received in response to the above information output, prior to notifying the above information issuing program of the anomaly, again re-outputs the above output information at least once, and, if an anomaly report is received even after re-outputting the information one or more times, notifies the above information issuing program of the anomaly. The information filter program receives information issued by the above intermediate processing program, judges whether fault data is stored in the above fault storage area, and, if the above fault data is not stored, outputs the above received information to the above storage system, whereas if the above fault data is stored, notifies the above intermediate processing program of the anomaly in response to reception of the above information.

The information processing system may comprise a storage system. The storage system may be a storage device (for example, a hard disk drive), or may be a storage device system comprising a plurality of storage devices. When the above fault data is not stored, the information filter program may notify the above intermediate processing program of the anomaly without outputting the received information to the storage system (for example, erasing the information).

A "specific fault" may be, for example, a fault related to the storage system, or may be a fault related to the information processing system without being related to the storage system (for example, a fault related to the copy control of the copy control program described below).

Further, the intermediate processing program may output exactly the same information received from the information issuing program, or may output information derived from the received information (for example, as the result of conversion into a format which can be interpreted by the storage system). Further, an "anomaly" exchanged within the first information processing system is, for example, data representing an anomaly.

According to a first embodiment of the first information processing system, the above storage system processes information issued by the above information processing system, and when the above information is processed normally, processing result data indicating normal processing is returned to the above information processing system, whereas when the above information cannot be processed normally, processing result data indicating an anomaly is returned to the above information processing system. In this case, the above information filter program receives the processing result data returned from the above storage system, and when the above received processing result data indicates normal processing outputs a normal result to the above intermediate processing program, but when the above received processing result data indicates an anomaly, stores the above fault data in the above fault storage area, and also outputs the anomaly to the above intermediate processing program.

According to a second embodiment of the first information processing system, in the above first embodiment, the above intermediate processing program issues information having an identifier. When the above received processing result data indicates an anomaly, the above information filter program registers the identifier of the information corresponding to this processing result data in the above fault storage area, and upon receiving information from the above intermediate processing program, if an identifier conforming to the identifier of the above received information is registered in the above fault storage area, notifies the above intermediate processing program of the anomaly.

According to a third embodiment of the first information processing system, the above storage system comprises a first logical volume. The first logical volume can form a pair with a second logical volume. The second logical volume is comprised by either the above storage system, or by another storage system connected to the above storage system. In the latter case, the above plurality of computer programs further comprises a copy control program which executes control related to copying of data between the above first logical volume and the above second logical volume, and which, if the above control is not performed normally, outputs control result data indicating an anomaly. The above information filter program issues requests to execute control to the above copy control program, receives the above control result data from the copy control program in response to the above requests, and, if the above received control result data indicates an anomaly, stores the fault data in the above fault storage area, and outputs the anomaly to the above intermediate processing program.

According to a fourth embodiment of the first information processing system, the above information processing system further comprises an information storage area to temporarily store information issued by the above intermediate processing program. Prior to storage of the above received information in the above information storage area, or after reading the above information from the above information storage area, the above information filter program judges whether fault data is stored in the above fault storage area.

According to a fifth embodiment of the first information processing system, the above plurality of computer programs further comprise a fault recovery detection program which detects whether there has been recovery from the above specific fault, and when recovery has been detected, records the fault recovery in the above fault storage area.

According to a sixth embodiment of the first information processing system, in the above fifth embodiment, the above fault recovery detection program, upon detecting that device information has been acquired relating to the above storage system, detects whether there has been recovery from the above specific fault.

According to a seventh embodiment of the first information processing system, in the above fifth embodiment, the above fault recovery detection program, upon detecting that a resource (for example, a logical volume) of the above storage system is online, detects whether there has been recovery from the above specific fault.

An information processing method according to a second aspect of the invention, in a system comprising an information issuing portion, an intermediate information processing portion, and a resource portion, has a step in which the information issuing portion issues information; a step in which the intermediate information processing portion receives and outputs the above issued information; a step in which the above output information is received, a judgment is made as to whether fault data is stored in a fault storage area, and, if the above fault data is not stored, the above output information is output to the above resource portion; a step in which the above resource portion receives the above output information, and, if the above received information cannot be processed normally, outputs processing result data indicating an anomaly; a step in which the above output processing result data is received, and if the above received processing result data indicates an anomaly, the fault data is stored in the above fault storage area and the anomaly is output to the above intermediate information processing portion; a step in which the above intermediate information processing portion, upon receiving an anomaly in response to the above information output, prior to notifying the above information issuing portion of the anomaly, again re-outputs the above output information; a step in which the above output information is received, a judgment is made as to whether fault data is stored in the above fault storage area, and, if the above fault data is stored, the above intermediate information processing portion is notified of the anomaly in response to the above information reception; a step in which the above intermediate information processing portion, upon receiving an anomaly in response to the above re-output, notifies the above information issuing portion of the anomaly; and, a step in which the above information issuing portion receives the anomaly and executes processing in response to the received anomaly.

Recording media according to a third aspect of the invention is computer-readable recording media on which is recorded a computer program to cause a computer to execute a step of receiving information output by an intermediate processing program, which receives and outputs information issued by an information issuing program, which issues information; a step of judging whether fault data is stored in a storage area; a step of outputting the above received information to a destination when the result of the above judgment indicates that the above fault data is not stored; and a step of notifying the above intermediate processing program of an anomaly in response to the above received information when the result of the above judgment indicates that the above fault data is stored.

An information processing system according to a fourth aspect of the invention communicates with a resource portion, and comprises a fault storage area which stores fault data, which is data relating to a specific fault; an information issuing portion, which issues information; an intermediate information processing portion; and an information filter portion. The above intermediate information processing portion receives and outputs information issued by the above information issuing portion, and when an anomaly is received in response to the above information output, prior to notifying the above information issuing portion of the anomaly, re-outputs the previously output information at least once, and when an anomaly is received even upon re-output at least once, notifies the above information issuing portion of the anomaly. The above information filter portion receives information issued by the above intermediate information processing portion, judges whether fault data is stored in the above fault storage area, and when the above fault data is not stored, outputs the above received information to the above resource portion, but when the above fault data is stored, notifies the above intermediate information processing portion of the anomaly in response to the above received information.

The entirety of or a portion of the above-described portions or steps can be realized in hardware, in a computer program, or in a combination of both. A computer program can be fixed in and distributed by means of, for example, a hard disk, an optical disk, semiconductor memory, or similar. A computer program can also be distributed via the Internet or another communication network.

The above-described information processing systems may be constructed within a single computer machine (for example, a personal computer, server, or storage device system), or may be constructed in a plurality of computer machines connected to a communication network.

BRIEF DESCRIPTION OF THE DRAWINGS

FIG. 4 shows an example of the configuration of fault information 3520;

FIG. 5 shows an example of the configuration of a SCSI command type judgment table 3530;

FIG. 6 shows an example of the configuration of an I/O return value judgment table 3540;

FIG. 7 shows an example of the configuration of a SCSI command return value judgment table 3550;

FIG. 8 shows an example of the configuration of a remote copy control return value judgment table 3560;

FIG. 13 shows an example of the processing flow of remote copy control software 1070a;

DESCRIPTION OF THE PREFERRED EMBODIMENTS

Figure 17A:
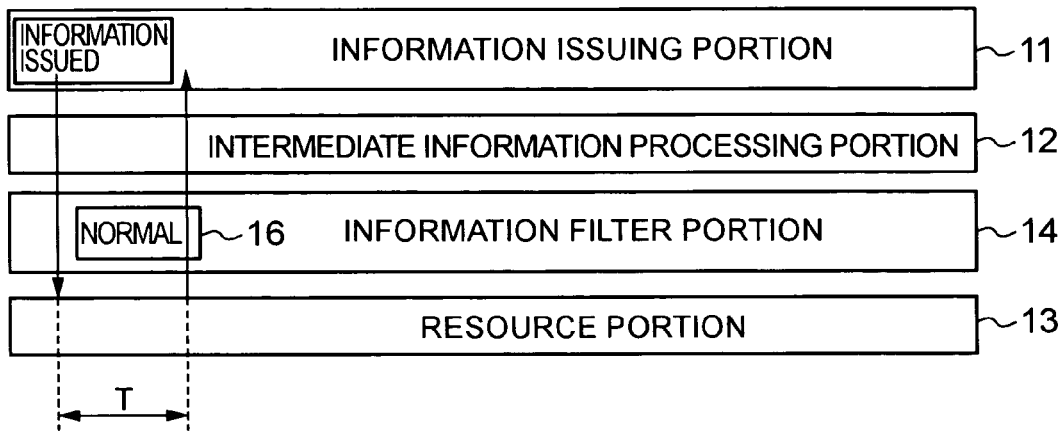
Figure 17B:
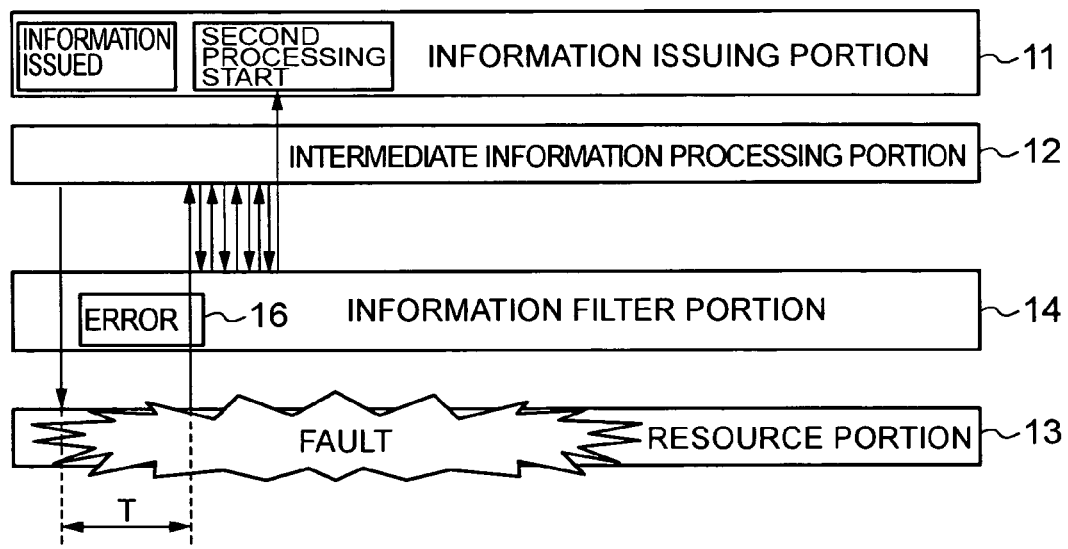
Figure 17C:
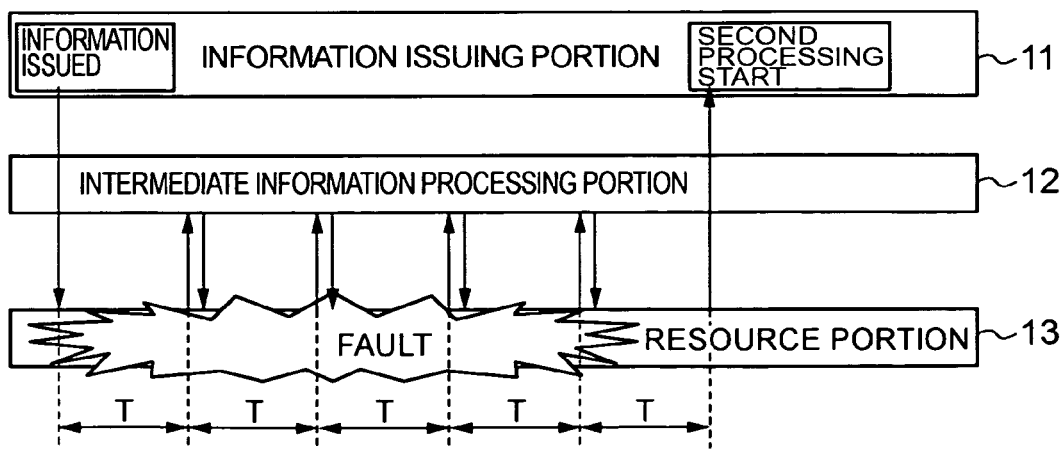

FIG. 17A through FIG. 17C show the concepts of a system of one embodiment of the invention, and an example of the processing flow in the system.

A system of this embodiment comprises an information issuing portion (for example, the cluster software described below) 11, an intermediate information processing portion (for example, the disk control software described below) 12, a resource portion (for example, the storage device system described below) 13, and an information filter portion (for example, the arbitration emulation software described below) 14. Exchanges between the information issuing portion 11 and intermediate information processing portion 12, exchanges between the intermediate information processing portion 12 and the information filter portion 14, and exchanges between the information filter portion 14 and the resource portion 13 are performed via prescribed media. Here, various entities, such as for example communication networks, communication interfaces, recording media and similar, can be adopted as "media". The information issuing portion 11, intermediate information processing portion 12, and information filter portion 14 can be realized as computer programs read by a CPU or other processor and executed by the processor, but are not limited to computer programs, and may also be hardware, or a combination of hardware and computer programs. The resource portion 13 may be the resources (for example, resources relating to computers) themselves, or may be a device comprising resources. Specifically, the resource portion 13 may for example be a physical storage device (for example, a hard disk or a drive comprising same), or may be a system comprising physical storage devices (for example a RAID system or other disk array system). The intermediate information processing portion 12 may be a driver (also called a "device driver") for the resource portion 13.

Below, an example of the flow of processing in this information processing system is explained, divided into a case in which no faults occur in the resource portion 13 (hereafter called the "normal case"), and a case in which a fault occurs in the resource portion 13 (hereafter called the "anomaly case").

(1) Normal Case

As shown in FIG. 17A, the information issuing portion 11 issues information (for example, data or commands). The intermediate information processing portion 12 receives information issued by the information issuing portion 11, converts this information into a format which can be interpreted by the resource portion 13 (hereafter called "resource information"), and issues this resource information. The information filter portion 14 receives resource information issued by the intermediate information processing portion 12, and issues this resource information to the resource portion 13.

The resource portion 13 processes the received resource information, generates information indicating the result of processing (hereafter "processing result information"), and issues the generated processing result information. Processing result information may be, for example, normal information indicating that processing has ended normally, or anomaly information indicating that an anomaly has occurred. The information filter portion 14 receives the issued processing result information, and upon detecting that the processing result information is normal information, issues the received processing result information to the intermediate information processing portion 12. The intermediate information processing portion 12 receives the processing result information issued by the information filter portion 14, and upon detecting that the processing result information is normal information, issues the processing result information to the information issuing portion 11. By this means, the information issuing portion 11 receives processing result information as the processing result of information issued by itself, and from this processing result information can ascertain that processing has been performed normally.

It is assumed that in a normal case, the time required from the time the information issuing portion 11 issues information until the time the processing result is received is T (where, for example, T is a number other than 0) (in the anomaly case described below also, it is assumed that at least time T is required from the time information is issued until reception of the processing result).

(2) Anomaly Case

Operation from the issuing of information by the information issuing portion 11 until processing by the resource portion 13 is similar to that in the normal case. However, a fault occurs in the resource portion 13, so that the resource portion 13 issues anomaly information as the processing result information.

When the information filter portion 14 detects that the received processing result information is anomaly information, error data indicating an error is set in a prescribed storage area 16. The information filter portion 14 then issues anomaly information to the intermediate information processing portion 12.

The intermediate information processing portion 12, upon receiving anomaly information, performs retry processing, by for example re-issuing the resource information issued in the past (specifically, the resource information corresponding to the anomaly information) without transmitting the received anomaly information to the information issuing portion 11. The information filter portion 14, upon receiving re-issued resource information, and if error data i sset, transmits the anomaly information to the intermediate information processing portion 12 in response to the resource information, without sending the received resource information to the resource portion 13. This processing is performed each time the intermediate information processing portion 12 performs retry processing.

If the intermediate information processing portion 12 executes retry processing a maximum number of times (for example, four times) set in advance, yet still receives anomaly information from the information filter portion 14, then the anomaly information is sent to the information issuing portion 11, without performing retry processing. By this means, the information issuing portion 11 receives processing result information as the processing result of information issued by itself, and from this processing result information can ascertain that an anomaly has occurred; in this case, second processing (for example, if the system is a cluster system, fail-over processing) can be initiated in response.

In the anomaly case, the length of time from the time the information issuing portion 11 issues information until the processing result is received appears from FIG. 17B to be longer than T (where for example T is a number other than 0), but in actuality can be set equal to T. At the least, in a system comprising an information filter portion 14 as in this embodiment, the time is shorter than the length of time (for example, five times T) during which retry processing is being performed the same number of times by the intermediate information processing portion 12, as shown in FIG. 17C.

According to this embodiment, even if the intermediate information processing portion 12 is configured such that when anomaly information is received retry processing is executed without notifying the information issuing portion 11, the retry processing can be ended quickly, so that the information issuing portion 11 can be made to detect the anomaly quickly, and second processing can be initiated more quickly.

The various constituent components of the above system can for example be arranged in a communication network. For example, the information issuing portion 11, intermediate information processing portion 12 and information filter portion 14 can be comprised by a single host device, or can be distributed among a plurality of host devices. Also, the resource portion 13 may be comprised by the same host device, or by a different device, such as for example a storage device system (such as a RAID system).

Below, examples of application to a cluster system of a system of an embodiment of this invention are considered, and a number of examples are explained.

EXAMPLE 1

Figure 1:
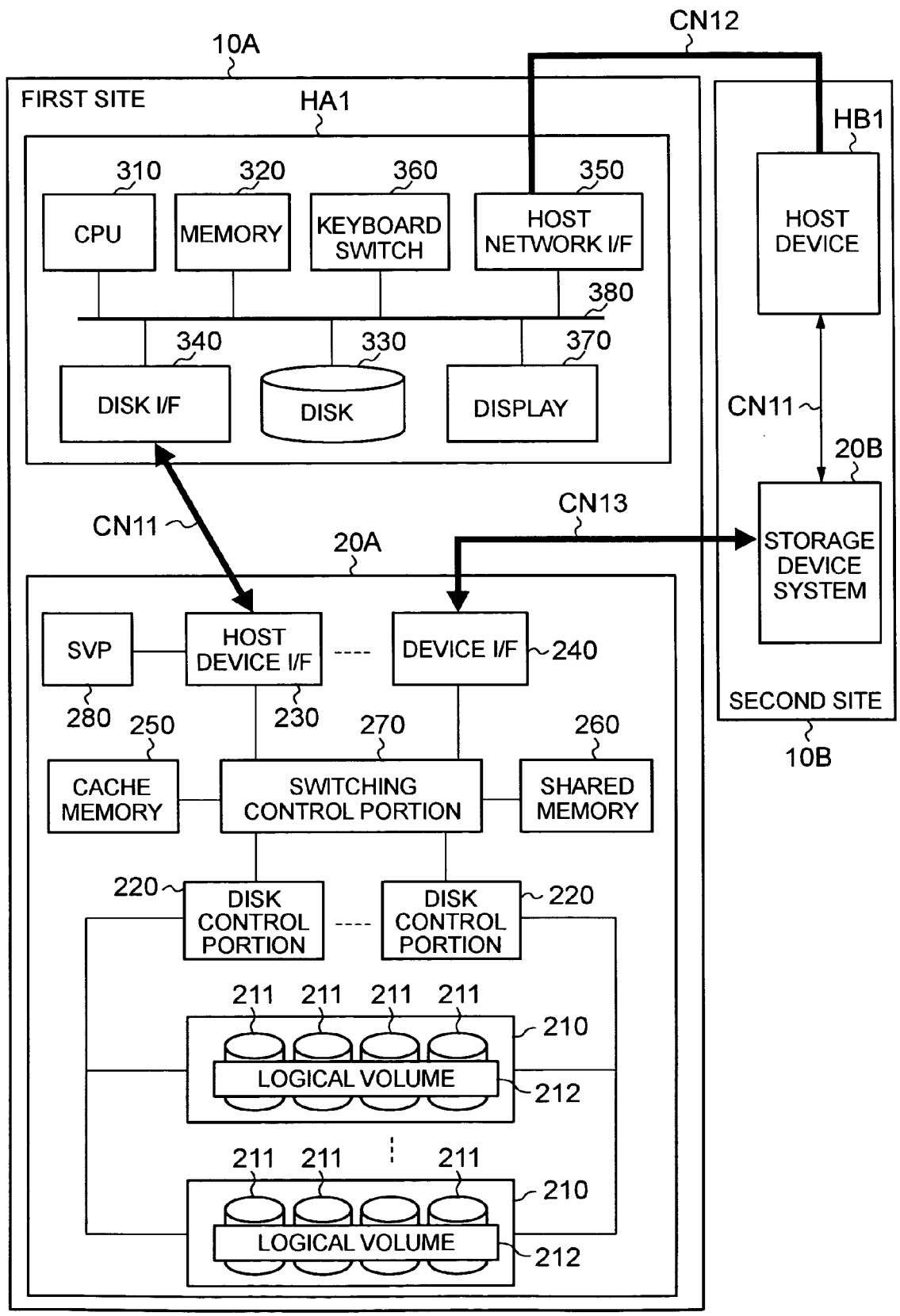
FIG. 1 is a block diagram showing in summary the entirety of a cluster system of a first example of an embodiment of this invention.

FIG. 1 is a block diagram which shows in summary the entirety of a cluster system of a first example of an embodiment of this invention. A cluster system comprises, for example, a first site 10A and second site 10B; the sites 10A and 10B are connected by communication networks CN12 and CN13. A cluster system can also comprise three or more sites.

The first site 10A and second site 10B can be positioned, for example, in separate cities. Also, the first site 10A and second site 10B can for example be positioned at different locations in the same administrative district. Or, the first site 10A and second site 10B can for example be provided within different buildings within the same location.

The first site 10A and second site 10B comprise essentially the same configuration. As one example, the first site 10A is a current site (operating site) which provides information processing services to a client machine, not shown. The second site 10B is a backup site (standby site) which backs up data, in anticipation of the occurrence of a fault in the first site 10A.

It is not in fact necessary to use an entire site as an operating site or as a standby site; each application program providing information processing service can be set as either an operating site program or as a standby site program. For example, the operating site of a first application program can be a first site 10A, and the operating site of a second application program can be set as a second site 10B.

The first site 10A comprises a or more host devices HA1 through HAn (HAn is not shown), and a storage device system 10A. Each host device HA1 through HAn is configured as, for example, a server machine using a microcomputer.

The storage device system 20A can be configured for example as a disk array subsystem. As described below, the storage device system 20A comprises a plurality of logical volumes 212, and these logical volumes 212 are used by the host devices HA1 through HAn.

Each of the host devices HA1 through HAn is connected to a storage device system 20A via a communication network CN11 within the site. This communication network CN11 is configured for example as a SAN (Storage Area Network), and performs data communication according to a fiber channel protocol.

Each of the above host devices HA1 through HAn is connected to other host devices via a communication network CN12. Each of the host devices HA1 through HAn of the first site 10A is also connected to a or more host devices HB1 through HBn (HBn is not shown) of the second site 10B via the communication network CN12. This communication network CN12 between host devices comprises, for example, the Internet, a LAN (Local Area Network), a WAN (Wide Area Network), a MAN (Metropolitan Area Network), or a similar network, and performs data communication based on TCP/IP (Transmission Control Protocol/Internet Protocol) or another protocol.

The second site 10B, like the above-described first site 10A, comprises a plurality of host devices HB1 through HBn and a storage device system 20B. These are configured similarly to that described for the first site 10A, and so an explanation is omitted.

Here, the storage device system 20A and storage device system 20B are directly connected by a remote copy line CN13 as a storage device network. The remote copy line CN13 is for example configured from a dedicated line or public line.

A network within a site CN11 is not limited to use of a fiber channel protocol, but may for example encapsulate SCSI commands in IP packets, as in iSCSI, to execute block-level data transfers over an IP network.

Below, representative examples of a host device HA1 and storage device system 20A are explained. The following explanation of a host device HA1 and storage device system 20A can also be applied to other host devices and other storage device systems.

A host device HA1 comprises, for example, a CPU 310, memory 320, disk 330, disk interface (hereafter "I/F") 340, host network I/F 350, keyboard switch 360, and display 370; these portions are interconnected by a bus 380.

The CPU (Central Processing Unit) 310 reads and executes program code stored in memory 320. By executing prescribed program code, the CPU 310 realizes cluster control, remote copying control, and various other processing or functions on the host device HA1.

The memory 320 comprises, for example, ROM (Read-Only Memory) and RAM (Random Access Memory) or similar. In the drawing, ROM and RAM are not differentiated, but in actuality, ROM which stores program code and similar, and RAM which is used as a temporary stage area, work area or similar, may be provided. The disk 330 is for example configured as a hard disk drive. The disk 330 stores, for example, programs and data. A portion of the storage area of the disk 330 may be used as a temporary area for storage of temporary files.

The disk I/F 340 is an interface circuit which controls data exchanges with the storage device system 20A via the site network CN11. The disk I/F 340 is for example based on SCSI, iSCSI or similar, and controls block-level data transfer. The host network I/F 350 is a circuit which controls data exchange with other host devices (HAn, HB1 through HBn) via the host device network CN12. The host network I/F 350 controls data transfer based for example on the IP (Internet Protocol).

The keyboard switch 360 is one example of information input means; a system manager can input necessary instructions and similar via the keyboard switch 360. The display 370 is an example of information output means, and can for example comprise a CRT (Cathode Ray Tube) display, liquid crystal display, plasma display, EL (Electroluminescent) display, or similar. The display 370 can display various information, either in response to an explicit request from a system manager, or spontaneously. The input and output means are not thereto limited, and for example a voice input device, voice output device, pointing device, printer, and similar may be used.

The hardware configuration of the storage device system 20A is explained. The storage device system 20A comprises, for example, a RAID group 210, disk control portion 220, host device I/F 230, device I/F 240, cache memory 250, shared memory 260, switching control portion 270, and service processor (SVP) 280.

The RAID (Redundant Array of Independent Disks) group 210 comprises a plurality of physical storage devices (hereafter "physical storage devices") 211, and provides redundant storage based for example on RAID 1, RAID 5, or similar. Each physical storage device 211 can comprise, for example, a hard disk drive, semiconductor memory device, optical disk drive, magneto-optical disk drive, or other storage device. At least one logical volume 212, which is a logical storage area, can be configured on the physical storage areas provided by each physical storage device 211. A logical volume 212 stores a large amount of data used by host devices H. Further, another logical volume 212 can also store control information and similar, and can be used as a system area. A physical storage device 211 need not be positioned entirely within the housing of the storage device system 20A. For example, a logical volume on another storage device system (not shown) positioned within the same site can also be used as a logical volume of the storage device system 20A. In the following explanation, a logical volume may be abbreviated simply to "volume".

The disk control portion 220 controls data exchange with each of the physical storage devices 211. The disk control portion 220 is configured, for example, as a microcomputer system comprising a CPU, ROM, RAM, and similar. A plurality of disk control portions 220 are provided within the storage device system 20A. The disk control portion 220 performs block-level data transfer with physical storage devices, based for example on SCSI, iSCSI, or similar.

The host device I/F 230 controls data transfers with host devices H via the site network CN11. The host device I/F 230, similarly to the disk control portion 220, can be configured as a microcomputer system. Host device I/Fs 230 can be prepared according to the type of host device H (server, mainframe, or similar). In this example, an example is explained in which a host device H is configured as a server, but the device may be a mainframe.

The device I/F 240 performs data communication with the storage device system 20B of the other site 10B via the remote copy line CN13. The device I/F 240 transfers update data and differential data written to the logical volume 212 to the other storage device system 20B, without passing through the host device H.

The cache memory 250 can for example be configured from volatile or nonvolatile semiconductor memory. The cache memory 250 stores write data (data written to a logical volume) from the host device H. The cache memory 250 also stores data read from a logical volume 212 (below called "read data").

Shared memory 260 can for example be configured from nonvolatile or volatile semiconductor memory. Shared memory stores, for example, various commands received from the host device H, control information used in control of the storage device system 20A, and similar. These commands, control information and similar are stored redundantly in a plurality of shared memory units 260. The cache memory 250 and shared memory 260 can be configured as separate memory devices; or, a portion of a memory device can be used as a cache memory area, and the remainder can be used as a shared memory area.

The switching control portion 270 connects the disk control portions 220, the host device I/Fs 230, the device I/F 240, cache memory 250, and shared memory 260. The switching control portion 270 can for example be configured from an ultra-high-speed crossbar switch or similar.

The SVP 280 collects and monitors the states of various portions within the storage device system 20A, via the host device I/F 230. The SVP 280 outputs information collected on internal states to an external management terminal (not shown), either as unmodified raw data, or as statistically processed data. Information which can be collected by the SVP 280 includes, for example, device configurations, power supply alarms, temperature alarms, input/output speeds (IOPS), and similar. A system manager can set and modify the RAID configuration and perform processing to block various packages (host device I/F, disk control portion, and similar) from a management terminal via the SVP 280.

Next, an example of processing performed by the storage device system 20A is explained. The host device I/F 230 receives write commands and write data from a host device H via the site network CN11. A received write command is stored in shared memory 260, and received write data is stored in cache memory 250. The disk control portion 220 references the shared memory 260 as necessary. The disk control portion 220, upon discovering an unprocessed write command stored in the shared memory 260, reads the write data from cache memory 250 according to the write command, and performs address conversion and similar. The disk control portion 220 stores the write data in physical storage devices 211 of the logical volume 212 specified by the write command.

A case of processing of a read request from a host device HA1 is explained. The host device I/F 230, upon receiving a read command from the host device HA1, stores the read command in shared memory 260. The disk control portion 220, upon discovering the unprocessed read command in the shared memory 260, reads data from the physical storage devices 211 of the logical volume 212 specified by the read command. The disk control portion 220 stores the read data in cache memory 250. Also, the disk control portion 220 notifies the host device I/F 230, via the shared memory 260, of the fact that reading of the requested data has been completed. The host device I/F 230 reads the data from the cache memory 250, and transmits the data to the host device HA1.

The above is an example of the hardware configuration of the cluster system of this example. Of course the site 10A, host device HA1 and storage device system 20A are not limited to the above-described configurations.

Figure 2:
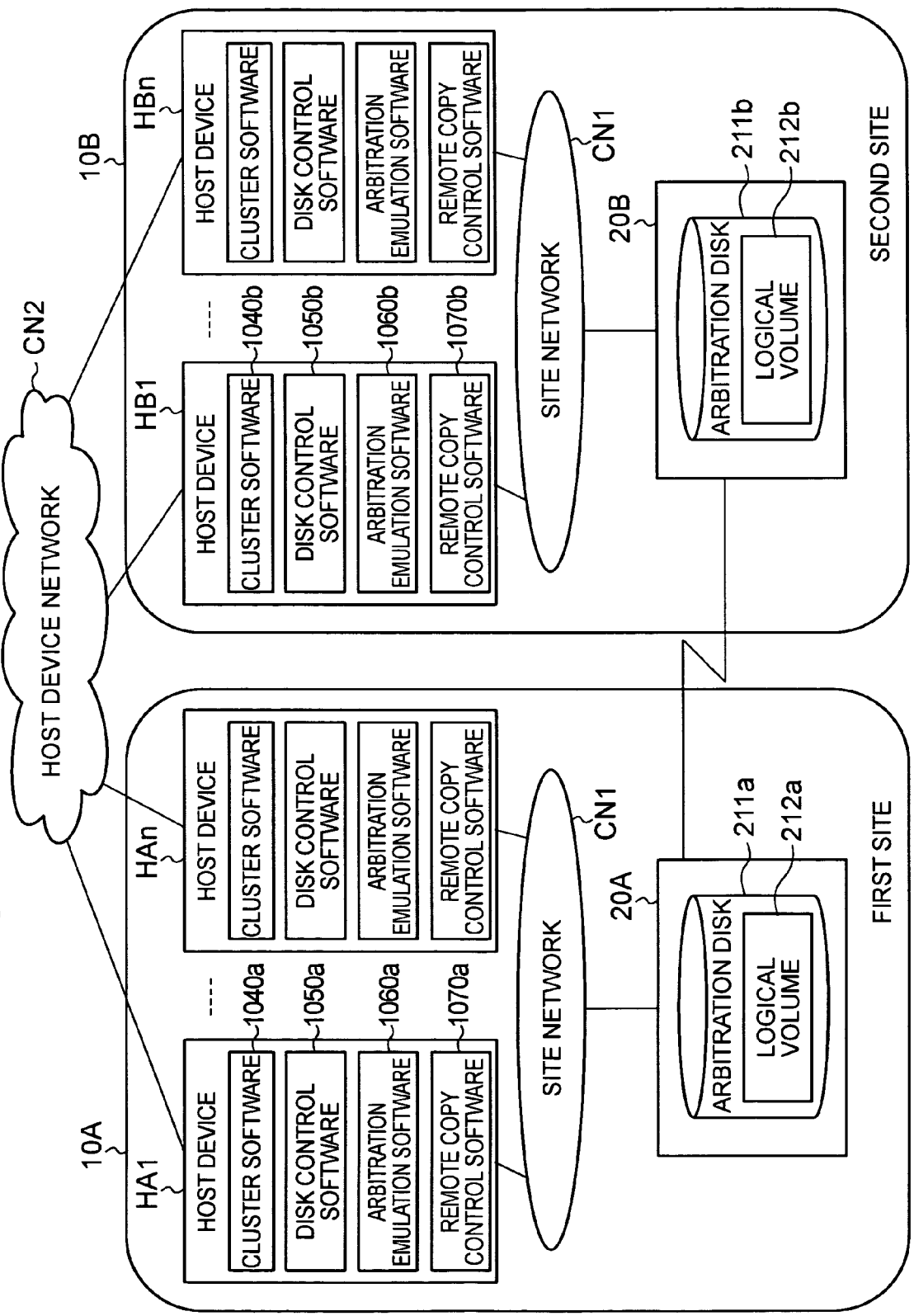
FIG. 2 shows various computer programs which operate within a host device HA1.

FIG. 2 shows various computer programs which operate within a host device HA1. Below, the host device HA1 within the first site 10A is explained as a representative example. In order to aid understanding of the explanation, "a" is appended to reference numbers for computer programs in the host device HA1, and "b" is appended to reference numbers for computer programs in the host device HB1 within the second site 10B.

In this example, one logical volume 212a comprised by the storage device system 20A forms part of a copy pair for remote copying, and another logical volume 212b comprised by the storage device system 20B forms the other part of the copy pair. Each of the two logical volumes 212a and 212b forming the copy pair is connected to a plurality of host devices, and the copy pair for remote copying is handled as a single shared volume. In FIG. 2, one or more of the physical storage devices comprised by one of the logical volumes 212a of the copy pair is labeled "arbitration disk 211a", and one or more of the physical storage devices comprised by the other logical volume 212b of the copy pair is labeled "arbitration disk 211b". All the arbitration disks 211a and 211b are used in the event of "arbitration", described in detail below. That is, in this example a first small cluster is formed by two or more host devices HA1 through HAn within the first site 10A, and a second small cluster is formed by two or more host devices HB1 through HBn within the second site 10B; a large cluster is formed by the first small cluster and the second small cluster, the logical volume 212a of the arbitration disk 211a and the logical volume 212b of the arbitration disk 211b are taken to be a single shared volume, and through this single large cluster, a single shared volume is used.

The plurality of computer programs in the host device HA1 comprises, for example, an operating system (for example, Windows (a registered trademark) or Linux (a registered trademark)), not shown; cluster software 1040a; disk control software 1050a; arbitration emulation software 1060a; and remote copy control software 1070a. At least one of the software programs 1040a, 1050a, 1060a, and 1070a may be configured so as to run as an operating system, or, may be configured so as to run as one application program on the operating system. The above-described plurality of computer programs is stored, for example, on the disk 330 (see FIG. 1), are loaded from the disk 330 into memory 320, and are executed by the CPU 310. By this means, each of the plurality of computer programs executes specific processing.

The cluster software 1040a is software to realize a cluster, and can, for example, detect the state of the storage device system 20A, detect the state of the host device HB1 via the host device network CN2, and execute fail-over processing. The cluster software 1040a may for example be by Microsoft Cluster Server (a cluster software package provided by Microsoft Corp.). The cluster software 1040a can for example issue various requests to the disk control software 1050a. In the following explanation, a request received by the disk control software 1050a is called an "internal request". An internal request may for example be a lock type request, or a read/write type request. A lock type request is a request related to exclusive control of use of a logical volume, and more specifically, "reserves" a logical volume used by the cluster software 1040a so as to prevent use by other host devices, and "releases" such a logical volume so as to enable use by other host devices. Read/write type requests are requests indicating data is to be written to a logical volume, or that data is to be read from a logical volume. "Enabling use by" can also be termed "releasing usage rights".

The disk control software 1050a is software which operates as a device driver of the storage device system 20A. The disk control software 1050a may, for example, receive internal requests from cluster software, convert internal requests into commands (for example, SCSI commands) in a format which can be interpreted by the storage device system 20A, and issues such requests (hereafter "I/O requests") comprising these commands. Further, the disk control software 1050a, upon receiving data indicating an anomaly status as the processing result of an issued I/O request, executes retry processing to re-issue the same I/O request as the above previously issued I/O request.

This retry processing is performed a number of retry times indicated by the number-of-retries information 2 registered, for example, in memory 320 (or in another storage device). Specifically, for example, the disk control software 1050*a* reads the number-of-retries information 2, ascertains the number of retries indicated by the number-of-retries information 2, and each time retry processing is performed, counts the number of times retry processing is performed, and when the count result matches the number of retries indicated by the number-of-retries information 2, notifies the cluster software 1040*a* of the I/O request processing result. When a result relating to an anomaly is received as the processing result of an I/O request, the cluster software 1040*a* initiates fail-over processing.

The arbitration emulation software 1060*a* is software to execute control (in this example, for convenience, called "arbitration") to prevent a split-brain state in which the host devices HA1, HB1 forming the cluster operate separately. The arbitration emulation software 1060*a* uses the arbitration disk 211*a* within the storage device system 20A to perform arbitration. The storage device system 20A can copy data within the arbitration disk 211*a* to the arbitration disk 211*b* in the storage device system 20B, either actively (in other words, using a push method) or in response to a request from the storage device system 20B (in other words, using a pull method).

The remote copy control software 1070*a* is software for controlling remote copying. The remote copy control software 1070*a* can, for example, creates and deletes copy pairs for remote copying, and swap the copy source and copy target of a copy pair. In more detail, for example, a direct instruction may be performed by the remote copy control software 1070*a*, and an indirect instruction may be performed by the arbitration emulation software 1060*a*. In still greater detail, the remote copy control software 1070*a* can for example become the application program interface (API) of certain software (not shown) installed on the host device HA1 to issue instructions to the storage device system 20A, and the arbitration emulation software 1060*a* can issue instructions to the storage device system 20A via the remote copy control software 1070*a* as the API.

In this example, two-stage arbitration is performed. To explain this briefly, in the first arbitration, arbitration using an arbitration disk is performed between two or more host devices within each site, so that an arbitration winner is determined within each site. In the second arbitration, arbitration is performed among two or more host devices which have each won arbitration within their sites, using arbitration disks 211*a*, 211*b* of copy pairs for remote copying, and the host device which wins this arbitration is the final winner. Below, one specific processing flow of this two-stage arbitration is explained. In this case, the first arbitration is performed by the cluster software 1040*a*, and the second arbitration is performed by the arbitration emulation software 1060*a*.

In the first arbitration, by for example issuing an I/O request having a SCSI command to the logical volume 212*a*, two or more host devices HA1 through HAn perform a lock state operation using a lock (Reserve, Release, Reset) command described below, or verify a particular sector using a read/write (Read, Write) command, and as a result the host device which is ultimately able to secure the logical volume 212*a* becomes the arbitration winner (strictly seeking, bus reset is not a SCSI command, but for convenience is included). Information relating to which host device has succeeded in securing the logical volume 212*a* (hereafter called "arbitration disk control information" 6) is for example registered in shared memory 260 by the host device I/F 230 of the storage device system 20A. The host device I/F 230, by referencing the arbitration disk control information 6, can refuse requests to access the logical volume 212*a* from an arbitration loser (host device). This first arbitration is also performed at other sites.

However, this operation alone would result in the following problem. Because the state of securing of one of the logical volumes 212*a* is not reflected in the other logical volume 212*b*, a logical volume forming a copy pair can be secured at each site, and consequently there is an arbitration winner (host device) at each site, as a result of which a plurality of arbitration winners exist in the cluster system.

In order to avoid this, in the present example the final arbitration winner is determined based on the copy pair state. More specifically, suppose that for example a logical volume the copy state of which is "copy source state" is in a state of being secured by a host device which has secured the logical volume; a logical volume the copy state of which is "copy target state" is in a state of being secured by another host device different from the host device which has secured the logical volume; and a logical volume the copy state of which is "copy interrupted" is in a state of not being secured by any host device. As a result, the host device which has secured the logical volume in the copy source state becomes the final arbitration winner, and the host device which had secured the logical volume in the copy target state recognizes that the latter logical volume has been secured by another host device. Information as to the copy state of the volume, what volumes form copy pairs and similar (for example, information indicating contents similar to the remote copy control information 4) is also comprised by the arbitration disk control information 6, and the host device I/F 230 may for example, by referencing this information 6, determine which volume is in what copy state.

In this way, two-stage arbitration is performed combining SCSI commands and remote copy control.

Figure 3:
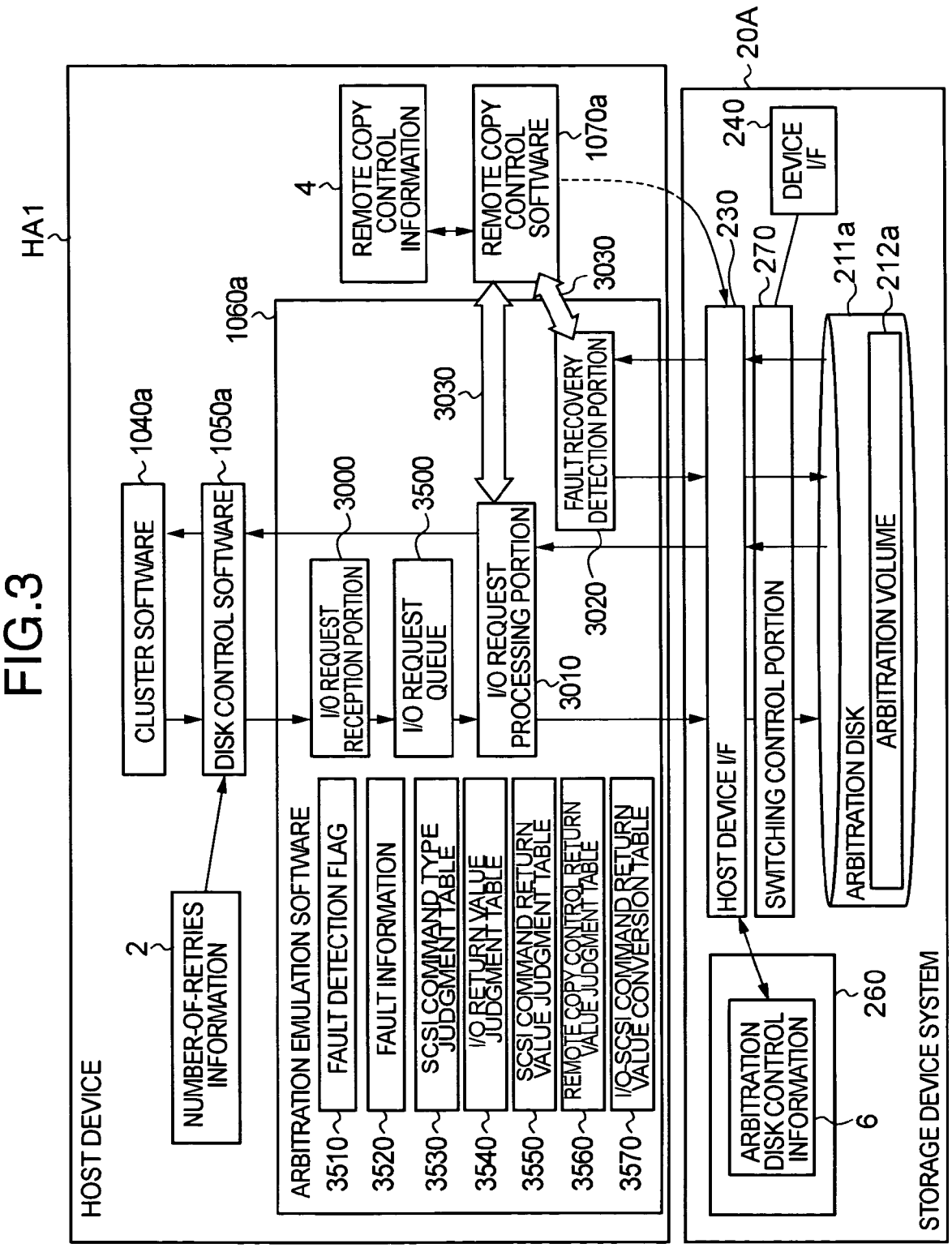
FIG. 3 shows in detail the software configuration of the host device HA1.

FIG. 3 shows in detail the software configuration of the host device HA1.

The arbitration emulation software 1060*a* comprises the I/O request reception portion 3000, I/O request processing portion 3010 and fault recovery detection portion 3020. In the memory 320 of the host device HA1 (or in another storage area) are prepared an I/O request queue 3500; fault detection flag 3510; fault information 3520; SCSI command type judgment table 3530; I/O return value judgment table 3540; SCSI command return value judgment table 3550; remote copy control return value judgment table 3560; and I/O-SCSI command return value conversion table 3570. At least one among these is used, as appropriate, as at least one among the I/O request reception portion 3000, I/O request processing portion 3010, and fault recovery detection portion 3020.

The I/O request queue 3500 is a mechanism to store I/O requests issued to the logical volume (hereafter the "arbitration volume" 212*a*) of the arbitration disk 211*a*, and is for example configured as a list.

The fault detection flag 3510 is a flag which records the occurrence of a fault in the arbitration disk 211*a* (hereafter called a "disk fault"). The fault detection flag 3510 is set to "ON" when a disk fault is detected, and is set to "OFF" when no disk fault is detected.

The fault information 3520 is information relating to detected disk faults, and indicates, for example, details of the anomaly status set for I/O return values and SCSI command return values from the arbitration disk 212a. Here an "I/O return value" is received from the storage device system 20A as information indicating the result of processing of the I/O request itself, and is received for all I/O requests issued, regardless of whether the I/O request comprises a SCSI command. A "SCSI command return value" is received from the storage device system 20A as information indicating the result of processing of a SCSI command comprised by an I/O request, and is received only in cases where an I/O request comprising a SCSI command is issued. That is, in this example, when the storage device system 20A (for example, the host device I/F 230) receives a SCSI arbitration I/O request, an I/O return value and SCSI command return value indicating the results of processing of the I/O request and the SCSI command comprised thereby respectively can be transmitted to the host device HA1.

The SCSI command type judgment table 3530 is a table in which is registered information relating to criteria for judging SCSI command types. More specifically, the SCSI command type judgment table 3530 is a table which stores, for example, criteria for judging whether a SCSI command comprised by an I/O request belongs to the lock type or to the read/write type.

The I/O return value judgment table 3540 is a table in which is registered information relating to criteria for how I/O return value contents should be judged. More specifically, the I/O return value judgment table 3540 is a table which stores, for example, criteria for judging whether an I/O return value is associated with normal status, anomaly status, or conflict.

The SCSI command return value judgment table 3550 is a table in which is registered information relating to criteria for how SCSI command return value contents should be judged. More specifically, the SCSI return value judgment table 3550 is a table which stores, for example, criteria for judging whether a SCSI command return value is associated with normal status, anomaly status, or conflict.

The remote copy control return value judgment table 3560 is a table in which is registered information relating to criteria for how remote copy control return value contents should be judged. More specifically, the remote copy control return value judgment table 3560 is a table which stores, for example, criteria for judging whether a remote copy control return value is associated with normal status, anomaly status, or conflict. A "remote copy control return value" is information received from the storage device system 20A as the result of remote copy pair control processing, described below.

The I/O-SCSI command return value conversion table 3570 is a table which stores criteria for judging which I/O return value and SCSI command return value to output, when a remote copy control return value is received.

Figure 10:
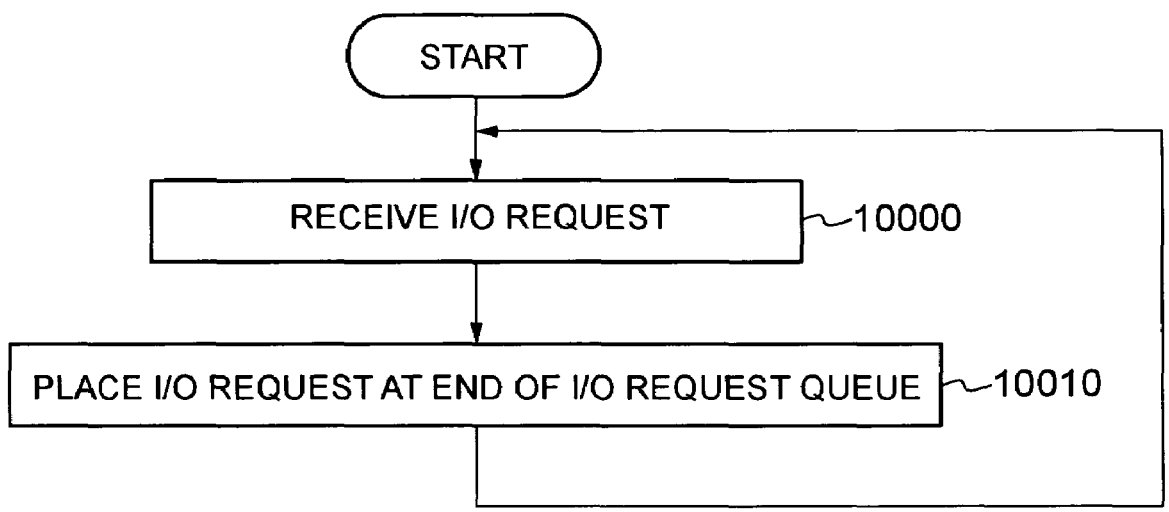
FIG. 10 shows an example of the processing flow of an I/O request reception portion 3000.

The I/O request reception portion 3000 receives an I/O request issued to the arbitration volume 212a from the disk control software 1050a, and performs processing to store the I/O request at a prescribed position (for example, at the end) of the I/O request queue 3500. FIG. 10 shows an example of the processing flow of this I/O request reception portion 3000.

Figure 11:
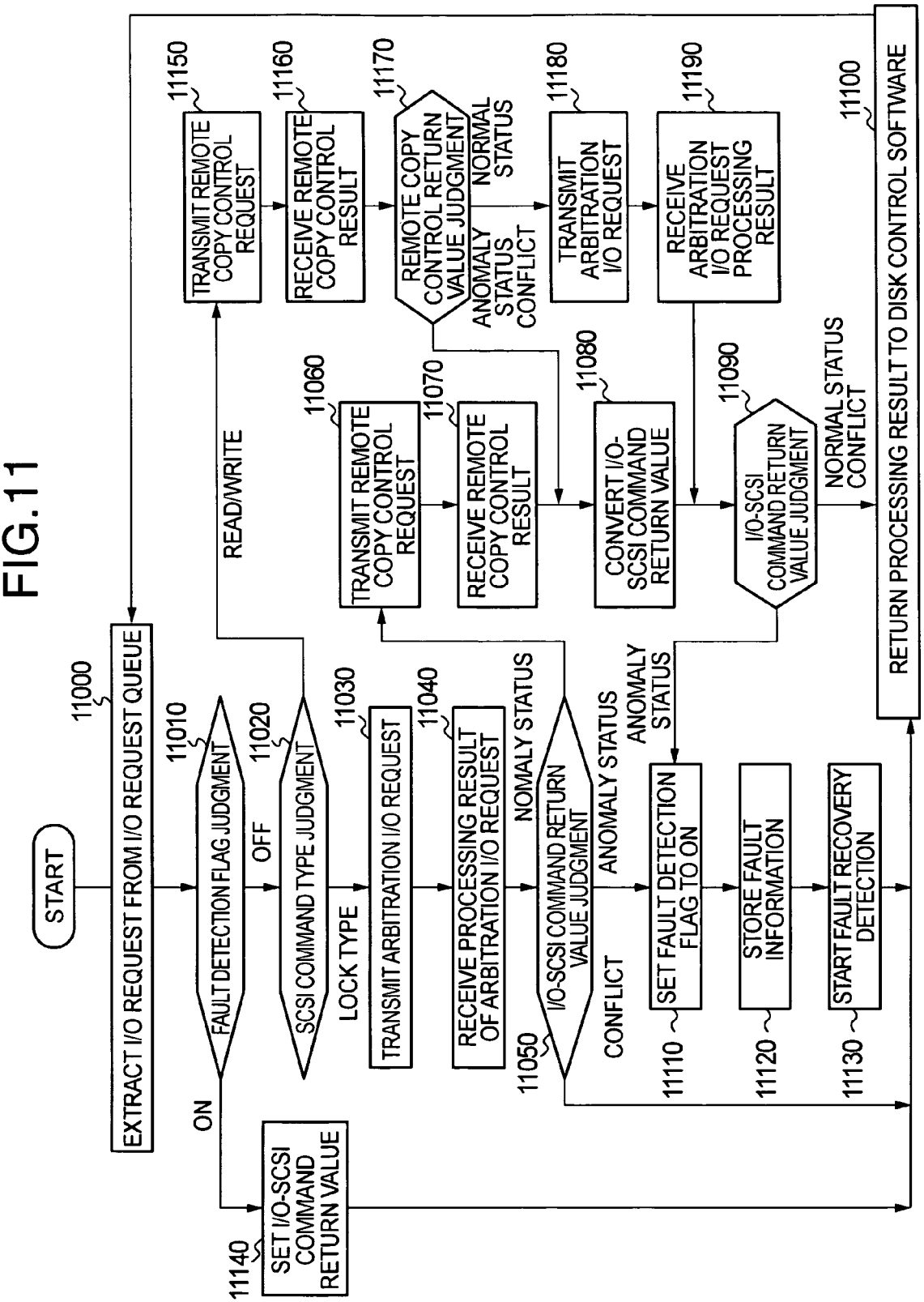
FIG. 11 shows an example of the processing flow of an I/O request processing portion 3010.

The I/O request processing portion 3010 extracts one I/O request at a time from the I/O request queue 3500, and performs the two-stage arbitration processing described above. In two-stage arbitration processing, it is necessary to communicate with the remote copy control software 1070a, and a software interface 3030 is used for this communication. As the software interface 3030, for example, a method employing an interface provided by the operating system, not shown, or a method in which data exchange is performed via memory which can be shared among the software modules, can be adopted. FIG. 11 shows an example of the processing flow of the I/O request processing portion 3010.

The fault recovery detection portion 3020 executes a separate thread when a disk fault is detected in processing by the I/O request processing portion 3010, and investigates the state of the arbitration disk 1030a with a certain timing (for example, periodically, or irregularly), until disk fault recovery is detected.

The remote copy control software 1070 performs remote copy pair control of the arbitration disk 211a of an arbitration volume 212a which is one portion of a copy pair. Details of control of the remote copy pair differ depending on details of communication with the I/O request processing portion 3010 via the software interface 3030. Also, for example the logical volume paired with an arbitration volume 212a, or whether an arbitration volume 212a is a copy source or a copy target, can be registered in the remote copy control information 6 (for example, existing in a prescribed storage area), so that by referencing this remote copy information 6, these details can be determined.

FIG. 4 shows an example of the configuration of fault information 3520.

The fault information 3520 comprises one or more I/O request identifiers, a fault I/O return value associated with each I/O request identifier, fault SCSI command return values, and fault remote copy control return values.

I/O request identifiers are identifiers of I/O requests associated with I/O return values or SCSI return values with anomaly status (in other words, I/O requests which were not processed normally), and may be for example the value of a pointer to the I/O request (for example, 0×1234). When there exist no I/O request identifiers in the fault information 3520, a prescribed initial value (for example, NULL) is set in the fault information 3520 as an I/O request identifier.

A fault I/O return value is the value set as the I/O return value itself when an I/O return value is judged to have anomaly status, and may be, for example, "TIMEOUT", "DISCONNECT", "BUSY", or similar. When there exist no fault I/O return values in the fault information 3520, a prescribed initial value (for example, "SUCCESS") is set as a fault I/O return value.

A fault SCSI command return value is the value set as the SCSI return value itself when a SCSI command return value is judged to have anomaly status, and may be, for example, "TIMEOUT", "DISCONNECT", "BUSY", or similar. When there exist no fault SCSI command return values in the fault information 3520, a prescribed initial value (for example, "GOOD") is set as a fault SCSI command return value.

A fault remote copy control return value is the remote copy control return value itself, when a remote copy control return value is judged to have anomaly status, and may be, for example, "TIMEOUT", "DISCONNECT", "BUSY", or similar. When there exist no fault remote copy control return values in the fault information 3520, a prescribed initial value (for example, "GOOD") is set as a fault remote copy control reutnr value.

FIG. 5 shows an example of the configuration of a SCSI command type judgment table 3530.

The SCSI command types of each of a plurality of SCSI commands are registered in the SCSI command type judgment table 3530. SCSI commands include, for example, Reserve, Release, Reset, Read, and Write; SCSI command types are lock the type and read/write type. The table 3530 shown in FIG. 5 indicates that the SCSI commands Reserve, Release and Reset belong to the lock SCSI command type. The table 3530 also shows that the SCSI commands Read and Write belong to the read/write SCSI command type.

FIG. 6 shows an example of the configuration of an I/O return value judgment table 3540.

A plurality of types of I/O return values, and I/O return value judgment results associated with the plurality of types of I/O return values, are registered in the I/O return value judgment table 3540. Below, an example of this association is explained, but associations are not thereto limited.

The I/O return value "SUCCESS" signifies that the I/O request issued to the arbitration volume 212a (hereafter abbreviated to "arbitration I/O request") was processed normally. The I/O return value "TIMEOUT" signifies that processing of the arbitration I/O request was delayed, resulting in a timeout. The I/O return value "DISCONNECT" signifies that the arbitration I/O request could not be passed (for example, the arbitration I/O request could not be stored in the cache memory 250 of the storage device system 20A). The I/O return value "BUSY" signifies that, because the arbitration disk 211a was in a busy state, the arbitration I/O request could not be processed.

An I/O return value judgment result is the result of judgment of the status associated with an I/O return value; the status may be, for example, normal status, anomaly status, or conflict. Normal status signifies that processing of the arbitration I/O request ended normally. Anomaly status signifies that an anomaly occurred in processing of the arbitration I/O request. Conflict signifies that because the arbitration volume 212a is reserved by another host device (that is, has been secured), the arbitration I/O request could not be processed.

According to the I/O return value judgment table 3540, when an I/O return value is "SUCCESS", the I/O return value is judged to be associated with normal status. When an I/O return value is "TIMEOUT" or "DISCONNECT", the I/O return value is judged to be associated with anomaly status. When the I/O return value is "BUSY", the I/O return value is judged to have status of either anomaly or conflict, and further judgment using the SCSI command return value judgment table 3550 becomes necessary.

FIG. 7 shows an example of the configuration of a SCSI command return value judgment table 3550.

A plurality of types of SCSI command return values, and SCSI command return value judgment results associated with each of the plurality of types of SCSI command return values, are registered in the SCSI command return value judgment table 3550. An arbitration I/O request may or may not comprise a SCSI command; but when either case is possible, "arbitration I/O request" is used, whereas in the case of an arbitration I/O request comprising a SCSI command, "SCSI arbitration I/O request" is used.

The SCSI command return value "GOOD" signifies that the SCSI arbitration I/O request was processed normally. The SCSI command return value "TIMEOUT" signifies that processing of the SCSI arbitration I/O request was delayed, so that a timeout occurred. The SCSI command return value "DISCONNECT" signifies that the SCSI arbitration I/O request could not be passed (for example, the SCSI arbitration I/O request could not be stored in the cache memory 250 of the storage device system 20A). The SCSI command return value "BUSY" signifies that because the arbitration disk 211a was in the busy state, the SCSI arbitration I/O request could not be processed. The SCSI command return value "CONFLICT" signifies that because the arbitration volume 212a was reserved by another host device (that is, was secured), the SCSI arbitration I/O request could not be processed.

A SCSI command return value judgment result is a result of judgment the status associated with a SCSI command return value; the status may be, for example, normal status, anomaly status, or conflict. Normal status signifies that processing of the SCSI arbitration I/O request ended normally. Anomaly status signifies that an anomaly occurred in processing of the SCSI arbitration I/O request. Conflict signifies that because the arbitration volume 212a is reserved by another host device (that is, has been secured), the SCSI arbitration I/O request could not be processed.

According to the SCSI command return value judgment table 3550, when a SCSI command return value is "GOOD", the SCSI command return value is judged to be associated with normal status. When a SCSI command return value is "TIMEOUT", "DISCONNECT" or "BUSY", the SCSI command return value is judged to have anomaly status. When a SCSI command return value is "CONFLICT", the SCSI command return value is judged to be conflict.

The above is an example of the configuration of a SCSI command return value judgment table 3550; however, the association of SCSI command return values and SCSI command return value judgment results is not limited to the above example.

FIG. 8 shows an example of the configuration of a remote copy control return value judgment table 3560.

A plurality of types of remote copy control return values, and remote copy control return value judgment results associated with each of the plurality of types of remote copy control return values, are registered in the remote copy control return value judgment table 3560. Below, an example of such associates is explained, but these associations are not limited to the example below.

The remote copy control return value "GOOD" signifies that remote copy control processing by the remote copy control software 1070a ended normally. The remote copy control return value "TIMEOUT" signifies that a delay occurred in remote copy control processing, so that a timeout occurred. The remote copy control return value "DISCONNECT" signifies that the arbitration disk 211a (or arbitration volume 212a) of the remote copy control could not be found. The remote copy control return value "BUSY" signifies that the arbitration disk 211a for remote copy control was in the busy state, and processing could not be performed. The remote copy control return value "CONFLICT" signifies that remote copy control processing ended normally, and that the copy state of the arbitration volume 212a was the "copy target state" (that is, that the arbitration volume 212a was the copy target logical volume).

A remote copy control return value judgment result is the result of judgement of the status associated with a remote copy control return value; the status may be, for example, normal status, anomaly status, or conflict. Normal status signifies that remote copy control processing ended normally. Anomaly status signifies that an anomaly occurred during remote copy control processing. Conflict signifies that remote copy pair control processing ended normally, and that the arbitration volume 212a is a copy target logical volume.

According to the remote copy control return value judgment table 3560, when a remote copy control return value is "GOOD", the remote copy control return value is judged to have normal status. When the remote copy control return value is "TIMEOUT", "DISCONNECT" or "BUSY", the remote copy control return judgment value is judged to have anomaly status. When the remote copy control return value is "CONFLICT", the remote copy control return value is judged to have conflict status.

Figure 9:
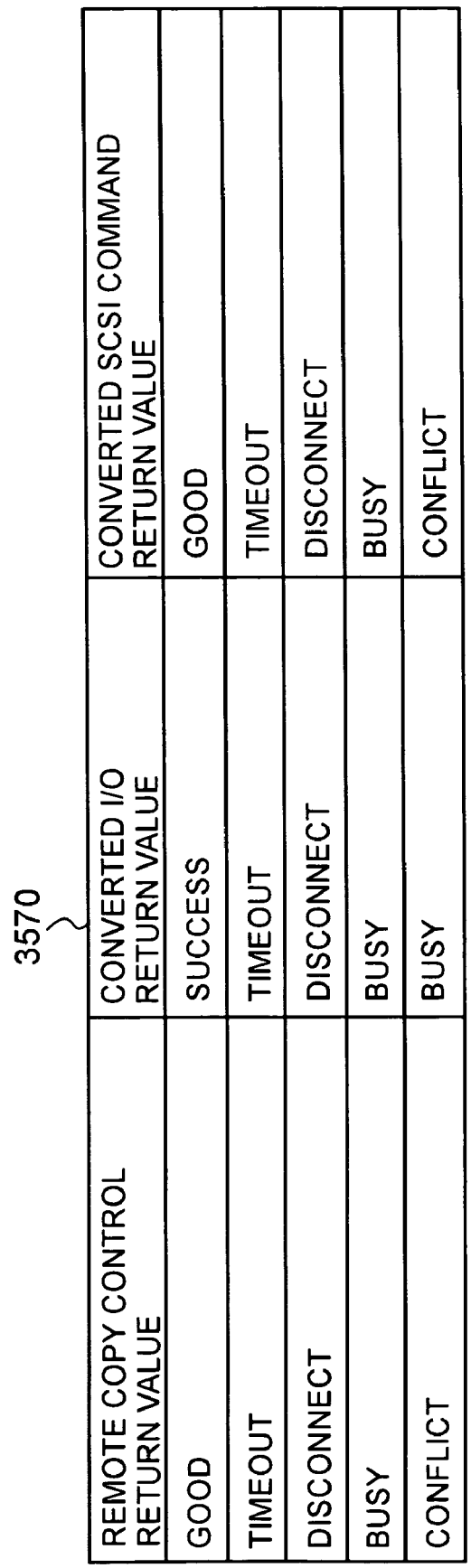
FIG. 9 shows an example of the configuration of an I/O-SCSI command return value conversion table 3570.

FIG. 9 shows an example of the configuration of an I/O-SCSI command return value conversion table 3570.

The I/O-SCSI command return value conversion table 3570 is a table which stores criteria for the output of I/O return values and SCSI command return values when any remote copy control return value such as described above has been received. Below, an example of these criteria is explained, but the criteria are not limited to the following example.

In the table 3570 a remote copy control return value of "GOOD" is associated with the converted I/O return value "SUCCESS" and with the converted SCSI command return value "GOOD". This signifies that, when "GOOD" is detected as the remote copy control return value, "SUCCESS" is output as the I/O return value of the I/O request comprising a SCSI command, and "GOOD" is output as the SCSI command return value of the I/O request.

Also, in the table 3570 a remote copy control return value of "TIMEOUT" is associated with the converted I/O return value "TIMEOUT" and with the converted SCSI command return value "TIMEOUT". This signifies that, when "TIMEOUT" is detected as the remote copy control return value, "TIMEOUT" is output as the I/O return value of the I/O request comprising a SCSI command, and "TIMEOUT" is output as the SCSI command return value of the I/O request.

Also, in the table 3570 a remote copy control return value of "DISCONNECT" is associated with the converted I/O return value "DISCONNECT" and with the converted SCSI command return value "DISCONNECT". This signifies that, when "DISCONNECT" is detected as the remote copy control return value, "DISCONNECT" is output as the I/O return value of the I/O request comprising a SCSI command, and "DISCONNECT" is output as the SCSI command return value of the I/O request.

Also, in the table 3570 a remote copy control return value of "BUSY" is associated with the converted I/O return value "BUSY" and with the converted SCSI command return value "BUSY". This signifies that, when "BUSY" is detected as the remote copy control return value, "BUSY" is output as the I/O return value of the I/O request comprising a SCSI command, and "BUSY" is output as the SCSI command return value of the I/O request.

Also, in the table 3570 a remote copy control return value of "CONFLICT" is associated with the converted I/O return value "BUSY" and with the converted SCSI command return value "CONFLICT". This signifies that, when "CONFLICT" is detected as the remote copy control return value, "BUSY" is output as the I/O return value of the I/O request comprising a SCSI command, and "CONFLICT" is output as the SCSI command return value of the I/O request.

Below, the flow of processing performed using the tables explained in FIG. 5 through FIG. 9 is explained, referring to FIG. 10 through FIG. 13. If FIG. 3 is referenced as appropriate to the following explanation, the overall flow of processing in the cluster system of this example can be better understood.

FIG. 10 shows an example of the processing flow of an I/O request reception portion 3000. In the following explanation, steps representing operation are abbreviated to "S".

Suppose that the cluster software 1040a issues to the disk control software 1050a an internal request indicating a request to the arbitration volume 212a. In this case, the disk control software 1050a converts the internal request into a SCSI command, generates an arbitration I/O request comprising this SCSI command (that is, a SCSI arbitration I/O request), and issues this SCSI arbitration I/O request to the arbitration emulation software 1060a.

The I/O request reception portion 3000 accepts I/O requests, and receives SCSI arbitration I/O requests from the disk control software 1050a (S10000). The I/O request reception portion 3000 stores received SCSI arbitration I/O requests at the end (or in another position) of the I/O request queue 3500 (S10010). Then, the I/O request reception portion 3000 again accepts I/O requests.

FIG. 11 shows an example of the processing flow of the I/O request processing portion 3010.

The I/O request processing portion 3010 extracts one I/O request from a prescribed position (for example, the beginning) of the I/O request queue 3500 (hereafter, the extracted I/O request is called the "SCSI arbitration I/O request") (S11000). However, when there is no I/O request stored in the I/O request queue 3500, the I/O request processing portion 3010 waits until a new I/O request is stored.

Next, the I/O request processing portion 3010 references the fault detection flag 3510 and judges the state of the fault detection flag 3510 (S11010).

If as a result of the judgment of S11010 the fault detection flag 3510 is detected to be "OFF" (that is, if no disk fault occurrence is detected), the I/O request processing portion 3010 performs the processing of step S11020. That is, the I/O request processing portion 3010 references the SCSI command type judgment table 3530 (see FIG. 5), and judges the type of the SCSI command comprised by the SCSI arbitration I/O request. More specifically, if the I/O request processing portion 3010 detects the SCSI command comprised by the SCSI arbitration I/O request to be "Reserve", "Release" or "Reset", the SCSI command type is judged to be a lock type, whereas if the SCSI command is detected to be "Read" or "Write", the SCSI command type is judged to be the read/write type. The subsequent flow of processing differs greatly depending on the result of this judgment S11020. Below, explanations are given for cases in which the result of the judgment of S11020 is the lock type and the read/write type.

(1) Case in which the lock type is judged in S11020 In S11020, when the SCSI command type is judged to be the lock type, the I/O request processing portion 3010 transmits the SCSI arbitration I/O request to the storage device system 20A (S11030). As a result, the I/O request processing portion 3010 receives the SCSI arbitration I/O request processing result from the storage device system 20A (S11040). This received processing result comprises the I/O return value and SCSI return value.

The I/O request processing portion 3010 uses the I/O return value received in step S11040 and references the I/O return value judgment table 3540 (see FIG. 6) to perform an I/O return value judgment to determine the status of the I/O return value, and moreover uses the SCSI command return value received in step S11040 and references the SCSI command return value judgment table 3550 (see FIG. 7) to perform a SCSI command return value judgment to determine the status of the SCSI command return value (S11050). If the I/O request processing portion 3010 detects that the I/O return value is "SUCCESS" and the SCSI return value is "GOOD", then the status is judged to be normal. If the I/O request processing portion 3010 detects that the I/O return value is either "TIMEOUT", "DISCONNECT" or "BUSY", and that the SCSI command return value is either "TIMEOUT", "DISCONNECT" or "BUSY", then the status is judged to be the anomaly status. If the I/O request processing portion 3010 detects that the I/O return value is "BUSY"

and that the SCSI command return value is "CONFLICT", then the status is judged to be conflict.

In S11050, if status is judged to be conflict, the I/O request processing portion 3010 returns the I/O return value and SCSI return value received in S11040 to the disk control software 1050a as the result of processing of the SCSI arbitration I/O request (S11100).

If in S11050 the status is judged to be anomaly status, the I/O request processing portion 3010 accesses the fault detection flag 3510, and updates the state of the fault detection flag 3510 from "OFF" to "ON" (S11110). By this means the occurrence of a disk fault is recorded in a storage area of the host device HA1 (for example, in an area of memory 320). Also, the I/O request processing portion 3010 records, in the fault information 3520 (see FIG. 4), the identifier (for example, pointer value) of the SCSI arbitration I/O request the status of which was judged to be anomaly status, the received I/O return value (that is, the fault I/O return value), and the received SCSI return value (that is, the fault SCSI return value) (S11120). Further, the I/O request processing portion 3010 causes the fault recovery detection portion 3020 to start another thread (S11130). By this means, monitoring to determine whether there has been recovery from the disk fault is begun. Finally, the I/O request processing portion 3010 returns, to the disk control software 1050a, the I/O return value and SCSI return value received in S11040, as the SCSI arbitration I/O request processing result (S11100).

If in S11050 the status is judged to be normal status, the I/O request processing portion 3010 transmits a remote copy control request to the remote copy control software 1070a via the software interface 3030 (S11060), and by this means effects remote copy pair control. The transmitted remote copy control request comprises a SCSI command, and the remote copy control software 1070a performs remote copy pair control according to the type of this SCSI command. The I/O request processing portion 3010 receives the control result, comprising a remote copy control return value, from the remote copy control software 1070a (S11070).

The I/O request processing portion 3010 references the I/O-SCSI command return value conversion table 3570 (see FIG. 9), and extracts the converted I/O return value and converted SCSI return value corresponding to the received remote copy control return value from the I/O-SCSI command return value conversion table 3570 (S11080). The I/O request processing portion 3010 then uses the converted I/O return value and converted SCSI return value thus acquired to perform judgment processing similar to that of S11050 (S11090).

If in S11090 the status is judged to be anomaly status, the I/O request processing portion 3010 performs the processing of the above-described S11110 and later. However, the I/O request processing portion 3010 has received the remote copy control return value in S11070, and so in S11120 the received remote copy control return value is also registered in the fault information 3520. Then, in S11100, the I/O request processing portion 3010 returns the I/O return value and SCSI return value acquired in S11080 to the disk control software 1050a.

If in S11090 the status is judged to be normal or conflict, the I/O request processing portion 3010 returns, to the disk control software 1050a, the I/O return value and SCSI return value acquired in S11080, as the SCSI arbitration I/O request processing result (S11100).

The above is the flow of processing when in S11020 the type is judged to be the lock type. Next, the flow of processing when in S11020 the type is judged to be read/write is explained.

(2) Case in which the read/write type is judged in S11020

If in S11020 the SCSI command type is judged to be read/write, the I/O request processing portion 3010 transmits to the remote copy control software 1070a a remote copy control request comprising the SCSI command, similarly to S11060 above (S11150). Then, the I/O request processing portion 3010 receives from the remote copy control software 1070a a control result comprising the remote copy control return value (S11160).

The I/O request processing portion 3010 uses the remote copy control return value received in step S11160 and references the remote copy control return value judgment table 3560 (see FIG. 8) to perform remote copy control return value judgment, to determine the status associated with the remote copy control return value (S11170).

If in S11170 the status is judged to be anomaly or conflict, the I/O request processing portion 3010 uses the remote copy control return value received in S11160 to perform the processing of the above-described S11080 and later. In S11100, the I/O request processing portion 3010 returns to the disk control software 1050a the I/O return value and SCSI return value acquired in S11080. Also, if in S11090 the status is judged to be anomaly status, in S11120 the I/O request processing portion 3010 registers in the fault information 3520 the remote copy control return value (other than "GOOD") received in S11160.

If in S11170 the status is judged to be normal, the I/O request processing portion 3010 transmits the SCSI arbitration I/O request to the storage device system 20A (S11180), and then receives the processing result for the SCSI arbitration I/O request from the storage device system 20A (S11190). The I/O request processing portion 3010 uses the I/O return value and SCSI return value comprised by the received processing result to perform the processing of the above-described S11090 and later. For example, in S11100 the I/O request processing portion 3010 returns the I/O return value and SCSI return value received in S11190 to the disk control software 1050a. Also, when for example in S11090 the status is judged to be anomaly, in S11120 the I/O request processing portion 3010 registers the remote copy control return value "GOOD" received in S11160 in the fault information 3520.

The above is an explanation of the flow of processing when in S11020 the type is judged to be read/write.

If in S11010 the fault detection flag 3510 is detected to be "ON" (that is, if the occurrence of a disk fault is detected), the I/O request processing portion 3010 performs the processing of step S11140. That is, the I/O request processing portion 3010 acquires from the fault information 3520 the fault I/O return value and fault SCSI return value corresponding to the identifier comprised by the SCSI arbitration I/O request acquired in S11000, and sets these acquired values in the processing result returned to the disk control software 1050a (S11140). Then the I/O request processing portion 3010 transmits this processing result (that is, data comprising the fault I/O return value and fault SCSI return value acquired in S11140) to the disk control software 1050a (S11100).

Figure 12:
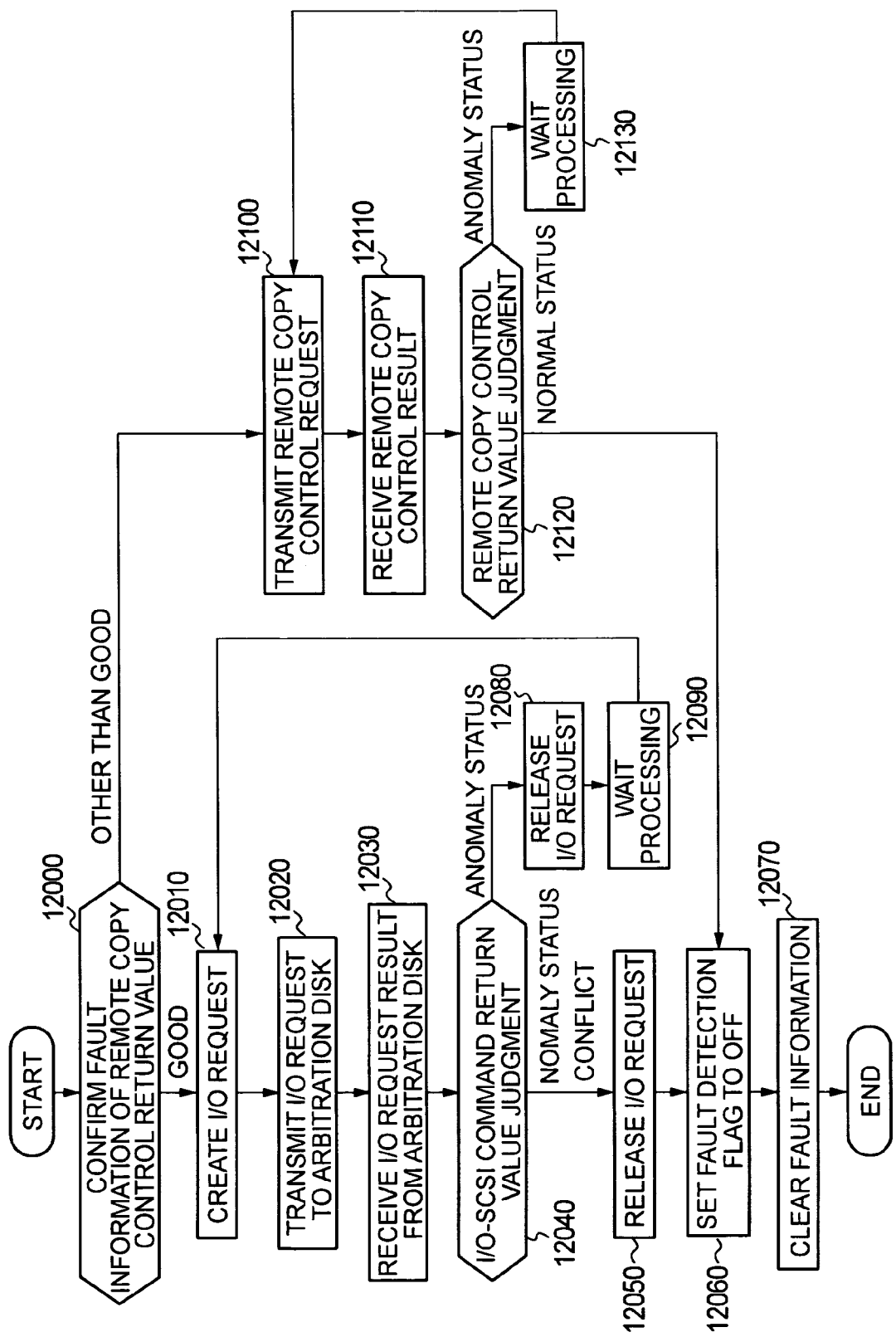
FIG. 12 shows an example of the processing flow of a fault recovery detection portion 3020.

FIG. 12 shows an example of the processing flow of the fault recovery detection portion 3020.

The fault recovery detection portion 3020 is started through, for example, the processing in S11130 of the I/O request processing portion (see FIG. 11), and can initiate the following processing.

The fault recovery detection portion 3020 first makes a judgment to determine the fault remote copy control return value in the fault information 3520 (S12000).

In S12000, a fault remote copy control return value of "GOOD" indicates that some fault relating to the arbitration disk 211a has occurred. In this case, the fault recovery detection portion 3020 creates a SCSI arbitration I/O request to detect recovery from the fault of the arbitration disk 211a (S12010). As the newly created SCSI arbitration I/O request, for example, an arbitration I/O request comprising a "Reserve" SCSI command can be employed. Also, the newly created SCSI arbitration I/O request (that is, the SCSI arbitration I/O request scheduled to be transmitted) can for example be registered in a storage area (for example, memory 320) of the host device HA1.

The fault recovery detection portion 3020 transmits the created SCSI arbitration I/O request to the storage device system 20A (S12020), and then receives the processing result from the storage device system 20A (S12030). The fault recovery detection portion 3020 uses the I/O return value and SCSI return value comprised by the received processing result to perform judgment processing similar, for example, to S11050 (see FIG. 11) (S12040).

In S12040, a judgment that the status is normal or conflict indicates that there has been recovery from the disk fault. In this case, the fault recovery detection portion 3020 releases the used SCSI arbitration I/O request (for example, erases the SCSI arbitration I/O request created in S12010 from the prescribed storage area) (S12050), changes the state of the fault detection flag 3510 from "ON" to "OFF" (S12060), erases the contents of the fault information 3520 (for example, by overwriting with an initial value) (S12070), and ends processing.

On the other hand, a judgment in S12040 that the status is anomaly indicates that the disk fault continues. In this case, the fault recovery detection portion 3020 releases the used SCSI arbitration I/O request (S12080), and after performing wait processing (S12090) again performs the processing of S12010. Wait processing is processing performed after the release of a used SCSI arbitration I/O request to maintain a standby state for a fixed length of time (for example, three seconds) until a SCSI arbitration I/O request is again created. The standby time may be a fixed value, or may be changed by the user.

In S12000, a fault remote copy control return value other than "GOOD" indicates that some fault relating to remote copy control, rather than a disk fault, has occurred (for example, occurrence of a fault in the remote copy control software 1070a). In this case, the fault recovery detection portion 3020 creates a remote copy control request and transmits the request to the remote copy control software 1070a (S12100). The contents of the transmitted remote copy control request may, for example, confirm the copy state of the remote copy pair. The fault recovery detection portion 3020 receives the result from the remote copy control software 1070a (S12110), and using the remote copy control return value comprised by the received result, performs a judgment similar for example to that of S11170 (see FIG. 11) (S12120). In S12120, if the status is judged to be normal, the fault recovery detection portion 3020 performs the processing of S12060 and later, but if the status is judged to be anomaly status, waits for a fixed length of time (for example, three seconds) (S12130) and then again performs the processing of S12100. The contents of the remote copy control request transmitted in S12100 confirm the state of the remote copy pair, and so the remote copy control return value is never set to conflict.

Figure 13:
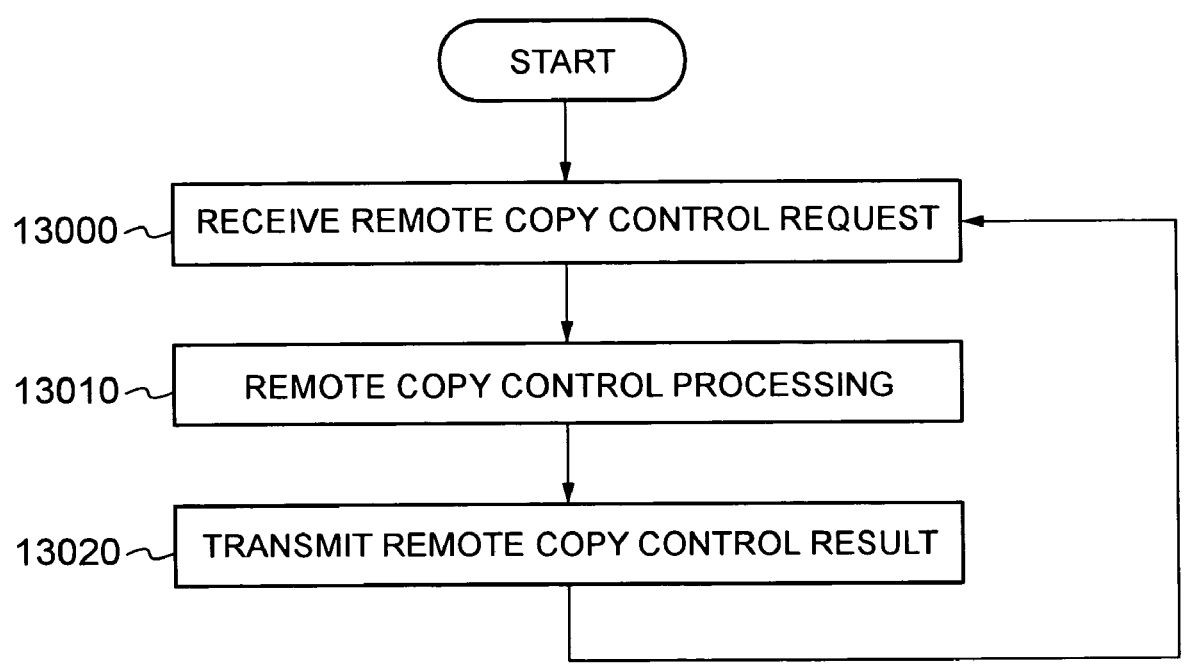

FIG. 13 shows an example of the processing flow of the remote copy control software 1070a.

The remote copy control software 1070a receives a remote copy control request from the I/O request processing portion 3010 or from the fault recovery detection portion 3020 (S13000).

Next, the remote copy control software 1070a executes remote copy control according to the remote copy control request received (S13010). Specifically, the remote copy control software 1070a for example can execute the processing of any of the following (1) through (3):

(1) processing to confirm the copy state of the arbitration volume 212a which is one logical volume of a copy pair;

(2) when the arbitration volume 212a is a copy source logical volume, remote copying, such as for example causing the storage device system 20A to execute processing to store the entirety or a portion of the data stored in the arbitration volume 212a (for example, the difference between existing data and newly written data) in the copy target volume 212b via the device I/F 240; and, (3) processing to invert the copy states of the arbitration volumes 212a and 212b, and accompanying this to transpose the data in the arbitration volume 212a and the data in the arbitration volume 212b.

The remote copy control software 1070a generates a remote copy control return value according to the remote copy control processing result, and transmits processing result data comprising this value to the transmission source of the remote copy control request (the I/O request processing portion 3010 or the fault recovery detection portion 3020) (S13020).

One of the above flows of processing may for example be summarized as follows.

(1) Case in which a SCSI arbitration I/O request comprising a lock-type SCSI command is output The arbitration emulation software 1060a, while receiving SCSI arbitration I/O requests from the device control software 1050a, outputs the SCSI arbitration I/O requests to the storage device system 20A (for example, attempting to win the first arbitration). When in response an I/O return value or SCSI command return value with normal status is received from the storage device system 20A (when for example a response to the effect that the first arbitration has been won is received), the arbitration emulation software 1060a transmits a remote copy control request to the remote copy control software 1070a (for example, attempting to win the second arbitration also). The remote copy control software 1070a, upon for example failing to put the arbitration volume 212a into the copy source state, outputs a remote copy control return value with anomaly status (for example, outputs a response to the effect that the second arbitration has been lost). The arbitration emulation software 1060a receives the remote copy control return value, acquires the I/O return value and SCSI command return value corresponding to the remote copy control return value, and, if the acquired I/O return value and SCSI command return value have anomaly status, turns the fault detection flag 3510 to "ON" and writes the acquired I/O return value and SCSI command return value to the fault information 3520.

(2) Case in which a SCSI arbitration I/O request comprising a read/write-type SCSI command is output The arbitration emulation software 1060a, while receiving SCSI arbitration I/O requests from the device control software 1050a, transmits a remote copy control request to the remote copy control software 1070a. When for example remote copying fails, the remote copy control software 1070a outputs a remote copy control return value with anomaly status. The arbitration emulation software 1060a receives the remote copy control return value, acquires the I/O return value and SCSI command return value corresponding to the remote copy control return value, and, if the acquired I/O return value and SCSI command return value correspond to anomaly status, turns the fault detection flag 3510 to "ON" and writes the acquired I/O return value and SCSI command return value to the fault information 3520.

According to the above-described first example, arbitration emulation software 1060a intervenes between the disk control software 1050a and storage device system 20A (the arbitration emulation software 1060a may be incorporated into the disk control software 1050a). The arbitration emulation software 1060a receives SCSI arbitration I/O requests from the disk control software 1050a and transmits these requests to the storage device system 20A, and receives the processing results of the SCSI arbitration I/O requests (data comprising the I/O return value and SCSI command return value) from the storage device system 20A. The arbitration emulation software 1060a judges whether an anomaly has occurred from the I/O return value and SCSI command return value comprised by the received processing result, and if it is judged that an anomaly has occurred, sets the state of the fault detection flag 3510 to "ON", stores the I/O return value and SCSI command return value at this time (the fault I/O return value and fault SCSI command return value) to a prescribed storage area, and transmits the fault I/O return value and fault SCSI return value to the disk control software 1050a. The disk control software 1050a, upon receiving a fault I/O return value and fault SCSI return value, performs retry processing, that is, retransmits the previously transmitted SCSI arbitration I/O request. The arbitration emulation software 1060a, upon receiving the same SCSI arbitration I/O request as when an anomaly was judged to have occurred during the period in which the fault detection flag 3510 is in the "ON" state, reads the fault I/O return value and fault SCSI command return value from a prescribed storage area immediately, without transmitting the I/O request to the storage device system 20A (for example, discarding the I/O request), and returns these to the disk control software 1050a. From the standpoint of the disk control software 1050a, the fault I/O return value and fault SCSI command return value are received immediately after retransmitting the SCSI arbitration I/O request as retry processing. Hence even if some fault occurs in remote copy control and a remote copy control return value is issued in response, the fault detection flag 3510 is set to the "ON" state, and similar processing is performed. By this means, even if retry processing is performed a plurality of times by the disk control software 1050a, the plurality of retry processing attempts ends more quickly (for example, after a much shorter length of time) than if SCSI arbitration I/O requests were transmitted to the storage device system 20A. Hence the cluster software 1040a can receive an error report from the disk control software 1050a more quickly (for example, even if retry processing is performed a plurality of times, the error report can be received with substantially the same timing, or nearly the same timing, as if retry processing had not been performed even once), and consequently fail-over processing can be initiated more quickly.

EXAMPLE 2

Below, a second example of an embodiment of the invention is explained. In the following, explanations of portions which are redundant with the first example are omitted or abbreviated, and the explanation focuses primarily on differences with the first example (and similarly for the third and subsequent examples as well as for the second example).

Figure 14:
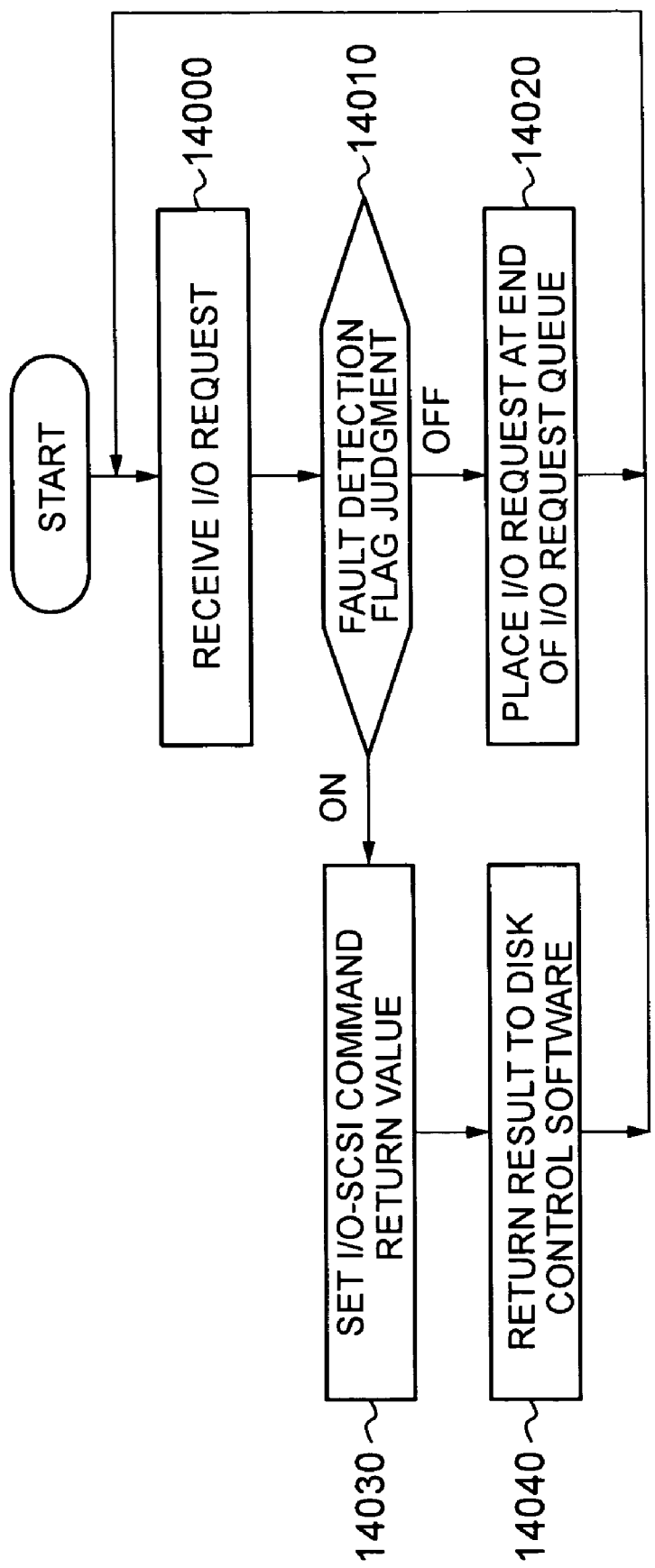
FIG. 14 shows an example of the processing flow of an I/O request reception portion 3000 in a second example of an embodiment of the invention.

FIG. 14 shows an example of the processing flow of the I/O request reception portion 3000 in the second example of an embodiment of the invention.

The I/O request reception portion 3000 receives a SCSI arbitration I/O request from the disk control software 1050a (S14000), and prior to storing the I/O request in the I/O request queue 3500, references the fault detection flag 3510 and judges the state of the flag (S14010).

If in S14010 the fault detection flag 3510 is judged to be in the "OFF" state, the I/O request reception portion 3000 stores the received SCSI arbitration I/O request in a prescribed position (for example, at the end) of the I/O request queue 3500 (S14020).

If on the other hand in S14010 the fault detection flag 3510 is judged to be in the "ON" state, the I/O request reception portion 3000 acquires the fault I/O return value and fault SCSI command return value corresponding to the identifier of the received SCSI arbitration I/O request from the fault information 3520 (S14030), and transmits these to the disk control software 1050a (S14040).

As described above, in this second example the I/O request reception portion 3000 judges the state of the fault detection flag 3510, and if the flag state is judged to be "ON", returns the fault I/O return value and fault SCSI command return value to the disk control software 1050a. Hence the I/O request processing portion 3010 need no longer perform the processing of the above-described S11010 and S11140 (see FIG. 11) (other processing is performed similarly to the first example).

EXAMPLE 3

In a third example, when a prescribed module (for example, a module of the operating system) detects a change in device information through Plug-and-Play (hereafter "PnP"), processing to acquire the device information is executed automatically by the operating system. Device information is for example information relating to the configuration of a storage device system 20A, and may for example be information such as the capacity of a logical volume on physical storage devices having certain attributes (such as, for example, high or low reliability). Device information is for example stored in the shared memory 260 of the storage device system 20A. A change in this device information can be recognized through, for example, notification by the storage device system 20A.

When acquisition of device information is initiated, the fault recovery detection portion 3020 is started, and the following processing is performed by the fault recovery detection portion 3020.

Figure 15:
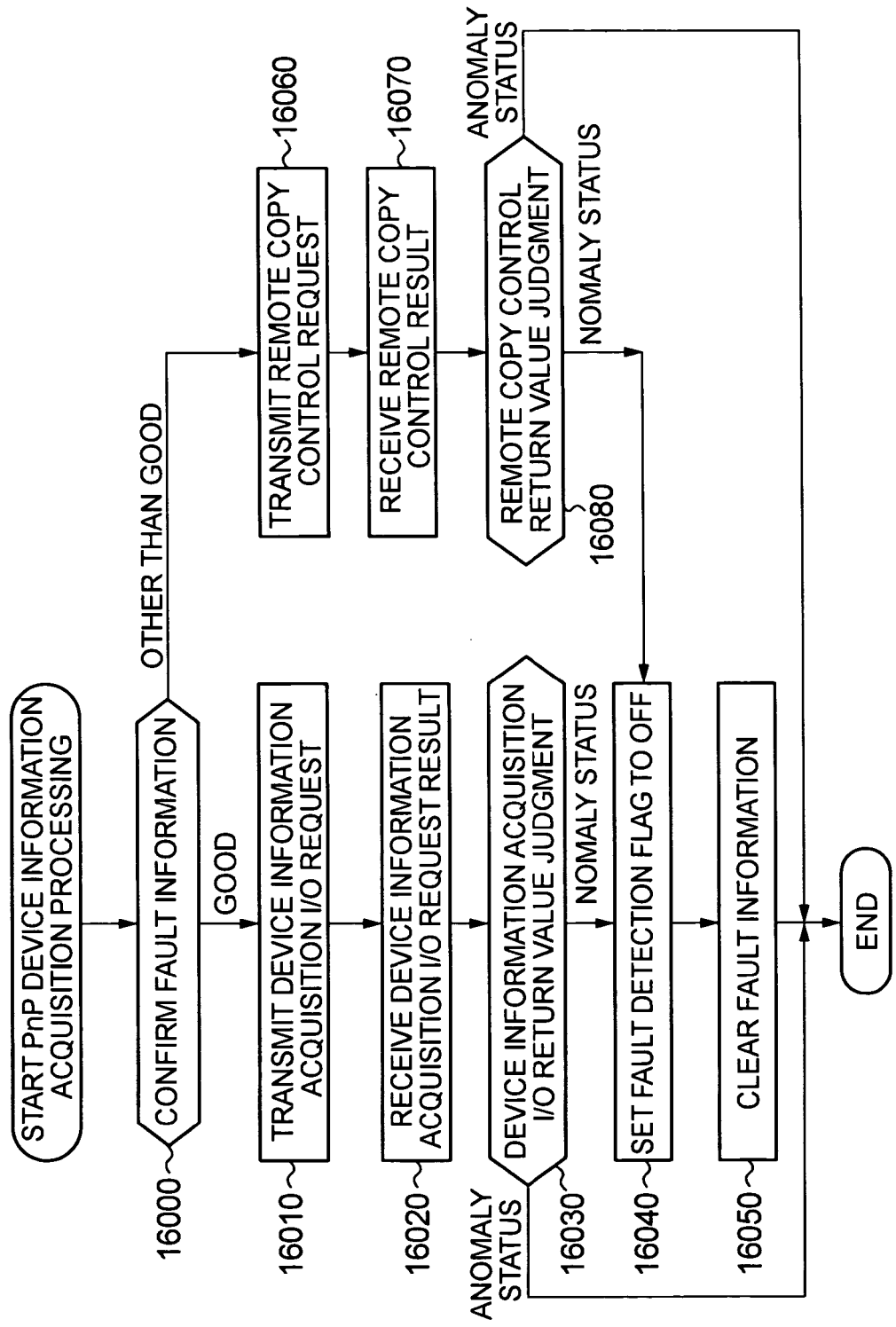
FIG. 15 shows an example of the processing flow of a fault recovery detection portion 3020 in a third example of an embodiment of the invention.

FIG. 15 shows an example of the processing flow of the fault recovery detection portion 3020 in the third example.

The fault recovery detection portion 3020 first judges the value of the fault remote copy control return value in the fault information 3520 (S16000).

In this step S16000, if it is judged that the fault remote copy control return value is "GOOD", the fault recovery detection portion 3020 generates a device information acquisition I/O request and transmits this to the storage device system 20A (S16010), and then receives the processing report for this I/O request from the storage device system 20A (S16020). As the transmitted device information acquisition I/O request, for example, a "Query Device Relations" PnP I/O request can be used.

The fault recovery detection portion 3020 uses the I/O request comprised by the received processing result to perform judgment processing similar for example to that of S11050 (see FIG. 11) (S16030). In S16030, when status is judged to be normal, the fault recovery detection portion 3020 changes the state of the fault detection flag 3510 from "ON" to "OFF" (S16040), erases the contents of the fault information 3520 (by for example overwriting with an initial value) (S16050), and ends processing. In S16030, when the status is judged to be anomaly, the fault recovery detection portion 3020 ends processing.

If in S16000 the fault remote copy control return value is judged to be other than "GOOD", the fault recovery detection portion 3020 performs processing similar to the above-described S12100 through S12120. In S12120, when the status is judged to be anomaly, the fault recovery detection portion 3020 ends processing.

EXAMPLE 4

In a fourth example, an example is described of a system in which the cluster software 1040a, by performing resource online processing to put the arbitration disk 211a (a cluster resource) into a usable state, detects fault recovery. Here "cluster resource" is a resource managed by the cluster (for example, a physical storage device or other hardware, or a database management system or other program).

Figure 16:
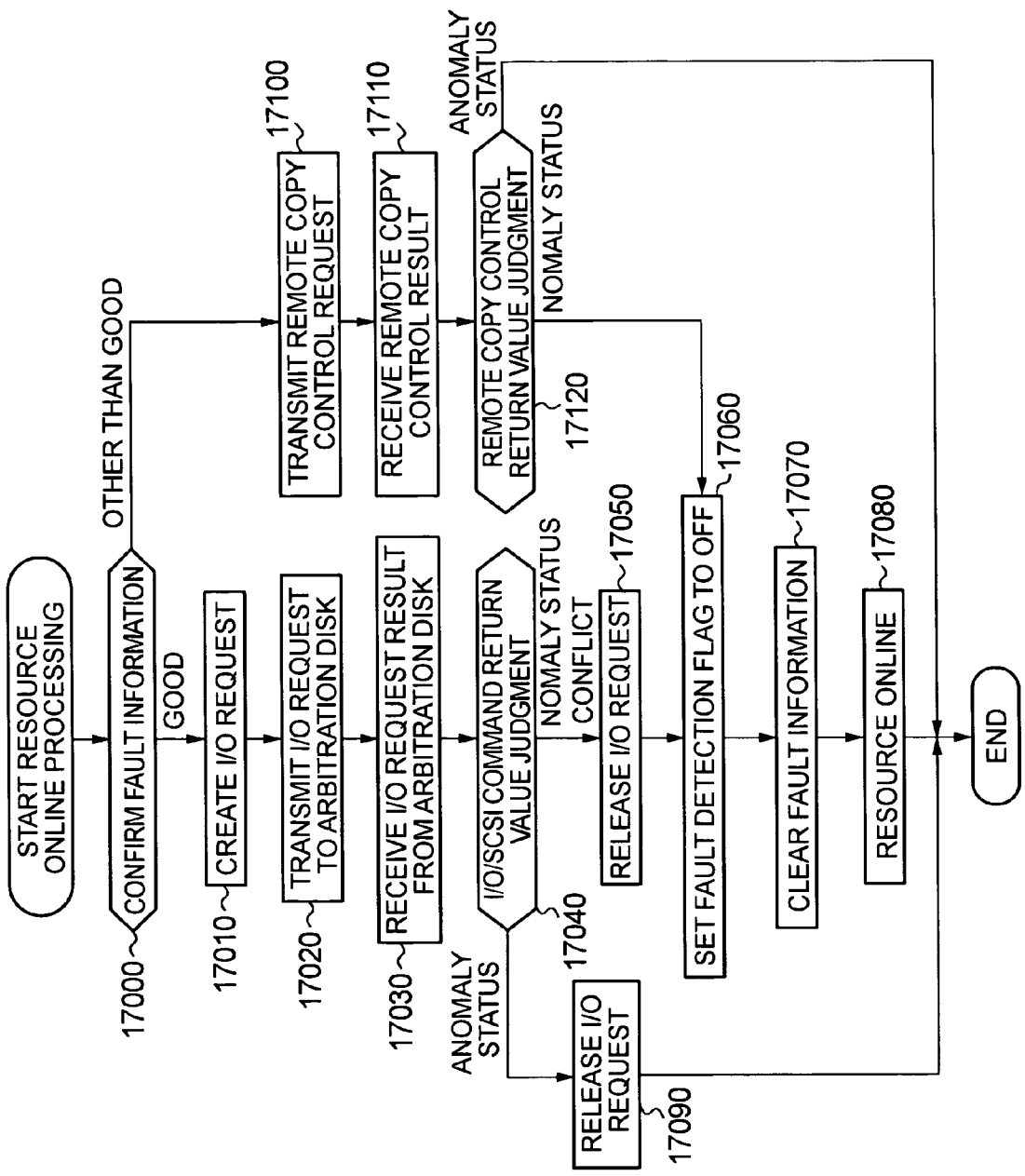
FIG. 16 shows an example of the processing flow of a fault recovery detection portion 3020 in a fourth example of an embodiment of the invention; and, FIG. 17A through FIG. 17C show the concepts of a system of one embodiment of the invention, and an example of the processing flow in the system.

FIG. 16 shows an example of the processing flow of the fault recovery detection portion 3020 in the fourth example.

For example, the fault recovery detection portion 3020 receives a startup command from the cluster software 1040a and performs the following processing.

The fault recovery detection portion 3020 performs processing similar to that of the above-described S12000 through S12070 (see FIG. 11) (S17000 through S17070). After the processing of S17070, the fault recovery detection portion 3020 puts the arbitration disk 211a into a state enabling use, that is, performs resource online processing to logically connect the arbitration disk 211a to a network CN12 or CN13 (S17080).

When, in S17040, the fault recovery detection portion 3020 judges the status to be anomaly, the I/O request transmitted in S17020 is released (S17090). Further, when in S17000 the fault recovery detection portion 3020 judges the return value to be other than "GOOD", processing similar to the above-described S16060 through S16080 (see FIG. 15) is performed (S17100 through S17120).

In the above, a number of examples of preferred embodiments of the invention have been explained, but these are illustrations used to explain the invention, and the scope of the invention is not limited to these embodiments and examples. This invention can be implemented with various modifications.

What is claimed is:

1. An information processing system which communicates with a storage system, comprising:
a program storage area which stores a plurality of computer programs;
a fault storage area which stores fault data relating to a fault occurred in the storage system; and
at least one processor which reads and executes at least one computer program from said program storage area, wherein said plurality of computer programs comprise:
an information issuing program which issues information;
an intermediate processing program which receives and converts the information issued by said information issuing program into a different format interpretable by the storage system, and then outputs the converted information to an information filter program; and
said information filter program which, when detects information received from the storage system is anomaly information regarding an anomaly occurred in the storage system, prior to notifying said information issuing program of the anomaly, outputs and then re-outputs said anomaly information at least once to the intermediate processing program, and when the anomaly continues even after said one or more re-outputs, notifies said information issuing program of the anomaly,
wherein the information filter program receives the converted information output by said intermediate processing program, judges whether fault data is stored in said fault storage area, either passes said converted information to said storage system when judging said fault data is not stored, or notifies said intermediate processing program of the anomaly in response to reception of said anomaly information without outputting said anomaly information back to said storage system when judging said fault data is stored in said fault storage area.

2. The information processing system according to claim 1, wherein said storage system processes the information issued by said information processing system, returns processing result data indicating normal processing to said information processing system when said information is processed normally, and sends said anomaly information to said information processing system when said information is not processed normally, and
said information filter program receives processing result data from said storage system, outputs a normal result to said intermediate processing program when said received processing result data indicates normal processing, and, when detecting said anomaly information, stores fault data in said fault storage area and outputs the anomaly information to said intermediate processing program.

3. The information processing system according to claim 2, wherein said intermediate processing system issues information having an identifier, and
said information filter program registers the identifier of information corresponding to said received processing result data in said fault storage area when detecting said anomaly information, and notifies said intermediate processing program of the anomaly information, if an identifier matching the identifier of said received information is registered in said fault storage area.

4. The information processing system according to claim 1, wherein
said storage system comprises a first logical volume;
said first logical volume forms a pair with a second logical volume;
said second logical volume is comprised by said storage system, or by a separate storage system connected to said storage system;
said plurality of computer programs further comprise a copy control program which executes control relating to copying of data between said first logical volume and said second logical volume, and, if said control is not performed normally, outputs control result data indicating an anomaly; and said information filter program requests execution of control by said copy control program, receives said control result data from said copy control program in response to said requests, and if said received control result data indicates an anomaly, stores fault data in said fault storage area, and outputs the anomaly information to said intermediate processing program.

5. The information processing system according to claim 1, wherein said information processing system further comprises an information storage area for temporary storage of information issued by said intermediate processing program, and said information filter program, prior to storing said received information in said information storage area, or after reading said information from said information storage area, judges whether fault data is stored in said fault storage area.

6. The information processing system according to claim 1, wherein said plurality of computer programs further comprises a fault recovery detection program which detects whether there has been recovery from said fault, and when recovery is detected, records the fault recovery in said fault storage area.

7. The information processing system according to claim 6, wherein, upon detection that device information relating to said storage system has been acquired, said fault recovery detection program detects whether there has been recovery from said fault.

8. The information processing system according to claim 6, wherein, upon detection of a change to online status of a resource of said storage system, said fault recovery detection program detects whether there has been recovery from said fault.

9. An information processing method, performed in an information processing system which communicates with a storage system and comprises a program storage area which stores a plurality of computer programs, a fault storage area which stores fault data relating to a fault occurred in a resource portion in the storage system, and at least one processor which reads and executes computer programs from said program storage area, said computer programs comprising an information issuing program, an intermediate information processing program, an information filter program said method comprising:

issuing by said information issuing program information;

receiving and converting by said intermediate information processing program said issued information into a different format interpretable by a resource portion of the storage system, and then outputting the converted information to said information filter program;

receiving by said information filter program said converted information from said intermediate information processing program, judging whether fault data is stored in the fault storage area, and either outputting said converted information to said resource portion when said fault data is not stored, or repeatedly notifying said intermediate information processing program anomaly information without outputting said anomaly information to said resource portion if judging said fault data is stored;

receiving by said resource portion said converted information, and either outputting processing result data normally to said information filter program if there is no fault occurred in the resource portion, or outputting said anomaly information to said information filter program if there is a fault occurred in the resource portion; and receiving by said information filter program data from said resource portion, detecting said received information is said output processing result data or anomaly information, either (1) if detected as said Processing result data, passing said processing result data to said information issuing program, or (2) if detected as said anomaly information, storing fault data in said fault storage area and repeatedly outputting the anomaly information to said intermediate information processing portion, prior to notifying said information issuing program of the anomaly information.

10. A computer program suite embedded in a computer-readable storage medium to operate an information processing system which communicates with a storage system and comprises a program storage area which stores a plurality of computer programs, a fault storage area which stores fault data relating to a fault occurred in a resource portion in the storage system, and at least one processor which reads and executes computer programs from said program storage area, said computer programs comprising an information issuing program, an intermediate information processing program, an information filter program, on which is recorded a computer program comprising: a module for issuing by said information issuing program information;

a module for receiving and converting by said intermediate information processing program said issued information into a different format interpretable by a resource portion of the storage system, and then outputting the converted information to said information filter program;

a module for receiving by said information filter program said converted information from said intermediate information processing program, judging whether fault data is stored in the fault storage area, and either outputting said converted information to said resource portion when said fault data is not stored, or repeatedly notifying said intermediate information processing program anomaly information without outputting said anomaly information to said resource portion if judging said fault data is stored;

a module for receiving by said resource portion said converted information, and either outputting processing result data normally to said information filter program if there is no fault occurred in the resource portion, or outputting said anomaly information to said information filter program if there is a fault occurred in the resource portion; and a module for receiving by said information filter program data from said resource portion, detecting said received information is said output processing result data or anomaly information, either (1) if detected as said processing result data, passing said processing result data to said information issuing program, or (2) if detected as said anomaly information, storing fault data in said fault storage area and repeatedly outputting the anomaly information to said intermediate information processing portion, prior to notifying said information issuing program of the anomaly information.

11. An information processing system, which communicates with a resource portion of a storage system, comprising:

a fault storage area which stores fault data relating to fault occurred in the resource portion;

an information issuing portion which issues information;

an intermediate processing program which receives and converts the information issued by said information issuing program into a different format interpretable by the resource portion, and then outputs the converted information to an information filter program; and said information filter program which, when detects information received from the resource portion is anomaly information regarding an anomaly occurred in the resource portion, prior to notifying said information issuing program of the anomaly, outputs and then re-outputs said anomaly information at least once to the intermediate processing program, and when the anomaly continues even after said one or more re-outputs, notifies said information issuing program of the anomaly, wherein the information filter program receives the converted information output by said intermediate processing program, judges whether fault data is stored in said fault storage area, either passes said converted information to said resource portion when judging said fault data is not stored, or notifies said intermediate processing program of the anomaly in response to reception of said anomaly information without outputting said anomaly information back to said resource portion when judging said fault data is stored in said fault storage area.

12. The information processing system according to claim 1, wherein the information issuing program is a cluster program, the intermediate processing program is a driver program for a storage system, and the information filter program is an information emulation program.

* * * * *